(12) United States Patent
Sawayama et al.

(10) Patent No.: US 6,376,271 B1
(45) Date of Patent: Apr. 23, 2002

(54) FABRICATION METHOD OF LIQUID CRYSTAL DISPLAY DEVICE

(75) Inventors: Yutaka Sawayama, Tenri; Kazuhiko Tsuda, Ikoma-gun; Shigeaki Mizushima, Ikoma, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/597,981

(22) Filed: Jun. 20, 2000

(30) Foreign Application Priority Data

Jun. 28, 1999 (JP) .......................................... 11-182356
Mar. 29, 2000 (JP) ...................................... 2000-092389

(51) Int. Cl.⁷ .............................................. H01L 21/00
(52) U.S. Cl. ............................. 438/30; 438/29; 438/71
(58) Field of Search ........................... 438/30, 29, 725, 438/780, 69, 71, 964

(56) References Cited

U.S. PATENT DOCUMENTS 5,408,345 A    4/1995  Mitsui et al.
5,953,084 A    9/1999  Shimada et al.
5,973,843 A   10/1999  Nakamura

FOREIGN PATENT DOCUMENTS

JP           504652 A   *  2/1993
JP         7032/1999       1/1999

* cited by examiner

*Primary Examiner*—C. Everhart
(74) *Attorney, Agent, or Firm*—Nixon & Vanderhye P.C.

(57) ABSTRACT

A dry film resist is used to form an interlayer insulating film in a process for fabricating a liquid crystal display device of the POP structure. The dry film resist is formed by applying a photosensitive resin on a base film to a uniform thickness, and a protective film layer is formed on a surface of the photosensitive resin film thus formed. From the dry film resist guided to the vicinity of a glass substrate, the protective film is removed immediately before transfer. Then, the photosensitive resin is heated and pressed against the foregoing glass substrate by a transfer roller, whereby the interlayer insulating film is formed.

15 Claims, 18 Drawing Sheets

103b

FIG. 13 (a) (PRIOR ART)
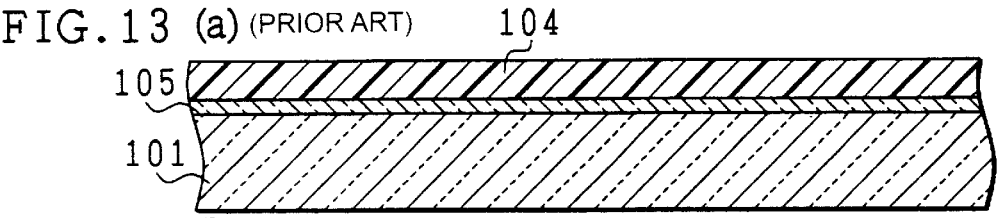
FIG. 13 (b) (PRIOR ART)
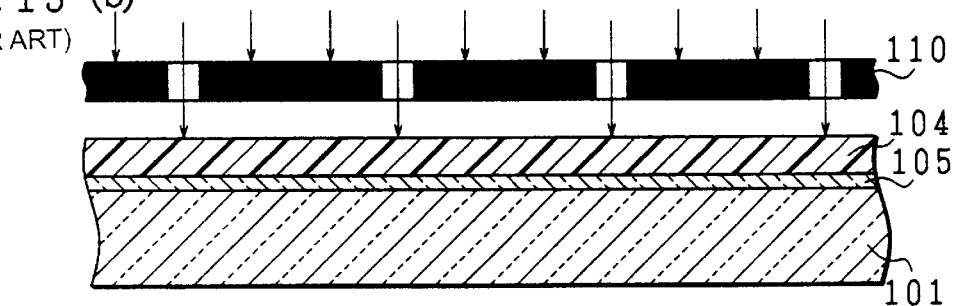
FIG. 13 (c) (PRIOR ART)
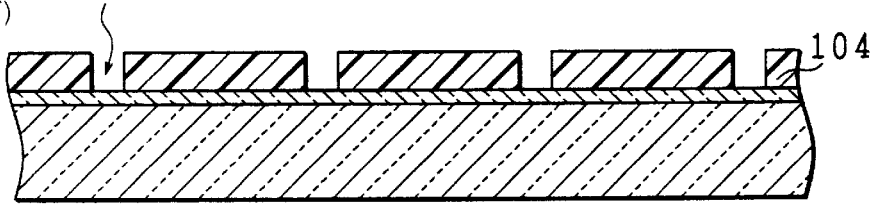
FIG. 13 (d) (PRIOR ART)
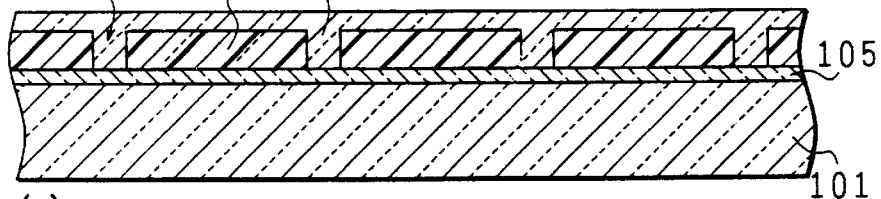
FIG. 13 (e) (PRIOR ART)
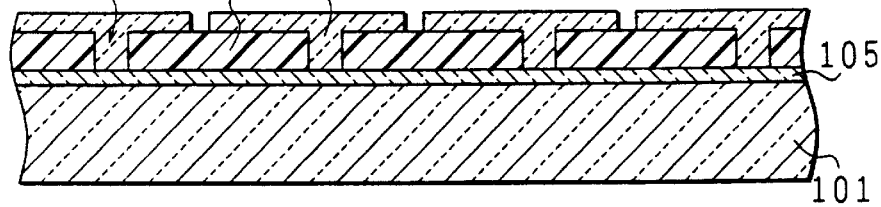

FABRICATION METHOD OF LIQUID CRYSTAL DISPLAY DEVICE

FIELD OF THE INVENTION

The present invention relates to a fabrication method of a liquid crystal display device, and particularly relates to a fabrication method of a liquid crystal display device of a pixel-on-passivation (POP) structure.

BACKGROUND OF THE INVENTION

Since an aperture ratio of unit pixels composing a liquid crystal display (LCD) device directly relates to brightness of a display per se, a high aperture ratio of an LCD device has been sought for conventionally. One example of means to achieve this is to make an LCD device in a POP structure as follows: as shown in FIG. 10(c), an interlayer insulating film 104 is provided between a glass substrate 101 having active elements (switching elements) such as TFT (thin film transistors) 102 and pixel electrodes 103b (indicated by alternate long and short dash lines in FIG. 10(a)), and each pixel electrode 103b is connected with each lower layer electrode 105 as a transparent electrode made of ITO (indium tin oxide) or the like via a contact hole 106. In the case of the LCD device of the foregoing POP structure, regions extending to above the signal lines shown in FIG. 10(a) (gate signal lines 122 and source signal lines 121) can be used as pixel regions. Accordingly, this device has a higher aperture ratio as compared with that of a non-POP-structure LCD device shown in FIG. 10(b) having a pixel electrode 103a (indicated by alternate long and two-short dashes lines in FIG. 10(a)).

Incidentally, FIG. 10(a) is a plan view illustrating a region on a pixel substrate (back substrate) corresponding to one pixel and its surroundings, the pixel substrate being a substrate on which pixel electrodes are provided. The pixel substrate is a substrate on which pixels are formed. The figure illustrates the pixel electrode 103a of the non-POP structure and the pixel electrode 103b of the POP structure together, for comparison.

In order that the pixel electrode 103b should have a light diffusing property, fine projections and recesses are formed on a surface of the interlayer insulating film 104 as shown in FIGS. 11(a) and 11(b), and moreover, the pixel electrode 103b is formed as a reflection electrode by using a high-reflection material such as aluminum. Consequently, an LCD device of reflection type having a high aperture ratio and not undergoing parallax can be realized.

Incidentally, FIG. 11(a) is a plan view of a pixel substrate provided with reflection electrodes on which projections and recesses are formed (contact holes are not shown), while FIG. 11(b) is a cross-sectional view of a region of the pixel substrate corresponding to one pixel.

Furthermore, a hybrid-type LCD device as shown in FIGS. 12(a) and 12(b), that is capable of reflection-type display and transmission-type display both, has been also developed. To form the foregoing LCD device, projections/recesses regions (reflection regions) 107 and regions (transmission regions) 108 from which the interlayer insulating film 104 is removed are simultaneously formed, so that, in the pixel electrode 103b, a high-reflection material such as aluminum is applied in the reflection regions 107, while the lower layer electrodes 105 functioning as the transparent electrodes are used as transmission regions 108.

The foregoing interlayer insulating film 104 is required to possess the following characteristics:

(i) a sufficient film thickness;
(ii) a small variation of the film thickness in one substrate; and
(iii) good processibility.

Examples of the such interlayer insulating film 104 include an inorganic film made of SiNx or SiO2, and a photosensitive organic film (photosensitive resin) such as a photoresist, but the inorganic film made of SiNx or SiO2 is difficult to be formed thick and to be processed. Therefore, it is substantially impossible to adopt the inorganic film in a reflection-type LCD device that requires shape-regulated fine projections and recesses to obtain a desired light diffusing property.

On the other hand, since the contact holes 106 and recessions and processions can be formed with respect to the foregoing photosensitive organic film by photolithography process, the photosensitive organic film is often adopted as the interlayer insulating film 104 in the LCD device of the POP structure.

However, by the foregoing conventional method, problems mentioned below arise as to (1) layer thickness distribution of the interlayer insulating film, (2) paralytic capacitance, (3) fabrication of a reflection-type LCD device, and (4) fabrication of a hybrid-type LCD device.

(1) Layer Thickness Distribution of Interlayer Insulating Film

FIGS. 13(a) through 13(e) illustrate a typical fabrication process of an LCD device of the POP structure. Note that TFTs and signal lines are omitted in FIGS. 13(a) through 13(e), so as to avoid complexity of illustration. The method of fabricating an LCD device of the POP structure is as follows.

(i) A photosensitive resin film is formed by spin-coating as the interlayer insulating films 104 on the glass substrate 101 on which the lower layer electrodes 105 are formed(see FIG. 13(a)).

(ii) The foregoing photosensitive resin film is exposed so as to be formed into the interlayer insulating films 104 by means of a photo-mask 110, so that the contact holes 106 for connecting the foregoing lower layer electrodes 105 and the pixel electrodes 103b that will be formed by a later step (see FIG. 13(b)).

(iii) The interlayer insulating film 104 is completed through development and baking (see FIG. 13(c))

(iv) An ITO film for formation of the pixel electrodes 103b is formed on the foregoing interlayer insulating film 104 (see FIG. 13(d)).

(v) The pixel electrodes 103b are formed by shaping the foregoing ITO film into a predetermined shape (see FIG. 13(e)).

In the foregoing step (i) shown in FIG. 13(a), the interlayer insulating film 104 is formed by spin-coating. The advantage of spin coating is that it allows a relatively uniform film thickness to be easily obtained. But, since a photosensitive resin material containing a solvent is applied, a phenomenon like "dried state irregularity" occurs when the solvent vaporizes. This phenomenon of "dried state irregularity" becomes more remarkable as the interlayer insulating film 104 is thicker.

Furthermore, according to the operational principle of the spin coater, the film thickness of a peripheral interlayer insulating film 104a on the periphery of the substrate tends to become thicker than the film thickness of a central interlayer insulating film 104b on a central part of the substrate as shown in FIG. 14(a), due to influences of surface tension and the like. Consequently, layer thickness distribution occurs to a certain extent in a single substrate.

Descriptions about effects achieved by thickening an interlayer insulating film are omitted here since the "Paralytic Capacitance" section, below, will mention the same, but the following three methods are deemed applicable to laminate a material of the interlayer insulating film or the like thicker by spin coating:

(i) to decrease the rate of rotation of the coater;
(ii) to apply the material repeatedly; and
(iii) to increase the viscosity of the material to be applied.

In the case of a coating process using a spin coater, a uniform film thickness is achieved by rotating a substrate, while a solvent mixed in a material is vaporized. Usually, greater effects are obtained as the substrate is rotated at a higher rate. Therefore, in the case where a film is formed by rotating the same at a lower rate, the effects decrease. For this reason, it is difficult to apply the foregoing method (i) to the process for fabricating an LCD device such as the LCD device of the POP structure typically in which "the material to be applied remains in the LCD device at the final stage".

Problems of the method (ii) are eloquent: repetition of the sequence of "coating-photolithography-baking" leads to a meaningless increase in the number of processing steps, and hence, to a decrease in the throughput and an increase in defects. In the case where the coating step is simply repeated, that is, in the case where the process is like "coating-coating- . . . -coating-photolithography-baking", a material for the next step is spouted out before a material such as a resist is baked, and this causes the previously formed film to be melted due to a solvent of the material. Consequently, let a film formed by the first coating step have a thickness of a μm, repeating the coating step n times does not allow the thickness to become a×n μm (the thickness becomes not more than a×n μm). Furthermore, irregularity in coating also tends to occur.

The method (iii) is a widely applied method for forming a film thicker. In the case of this method, however, there arise problems such as (a) an increase in the material spouting time, and (b) difficulty in optimization of various conditions of the coating process.

The following description will explain the foregoing problem (a). In the case where a material such as resist is spouted out, the material is usually filtered so that foreign materials mixed therein are removed. Here, in the case where the material to be spouted out has a high viscosity, the filtering requires a significant pressure, and also much time. If a filter of large mesh is used so that the spouting time is reduced, foreign materials cannot be perfectly removed. Therefore, use of a filter of large mesh for reducing the spouting time is not appropriate.

Moreover, the foregoing problem (b), though varying with materials and substrates subjected to the coating process, includes the difficulty in spreading the material spouted out throughout the substrate (some areas tend to remain uncoated), and the necessity of carrying out so-called "conditioning" significantly strictly at every stage of the coating process, such as the finishing at the final stage for making the film thickness uniform throughout the substrate. Even in the case where the optimum conditions are found, the "optimum conditions" may vary with changes in the stage of the substrate, ambient conditions, changes in materials as aging, etc. Therefore, it is extremely difficult to always form an interlayer insulating film so as to be thick and to have stable properties (thickness, distribution in one substrate).

The reason why the foregoing problems relating to the film thickening have been hardly focused is that layer thickness distribution of the resist film does not particularly matter when an LCD device having resolution at a conventional level is produced, since a resist film for formation of active elements such as TFTs for an LCD device is peeled off after etching. In the case where, however, the resist film is adopted as an interlayer insulating film in the LCD device of the POP structure, the layer thickness distribution remains in the cell. Therefore, in the case of the LCD device of the POP structure, the layer thickness distribution of an interlayer insulating film directly leads to defects in cell thickness.

FIG. 14(b) schematically illustrates a cross section of a panel formed by causing (1) a pixel substrate 111 composed of the glass substrate 101 and the interlayer insulating film 104 formed thereon and (2) a counter substrate 112 to adhere to each other by means of a substrate sealing material 113, in the case where layer thickness distribution of the interlayer insulating film 104 occurs throughout the substrate. A cell gap d3 in the center of such a liquid crystal cell becomes greater than a cell gap d4 in the periphery thereof. Such non-uniformness of the cell thickness (serious cell thickness distribution in the substrate) is remarkable in a reflection-type LCD device particularly. The reasons are that adjustment by backlight as in a transmission-type LCD device is impossible since it utilizes light in the surroundings, that the panel is affected twice that in the case of the transmission-type LCD device since retardation is proportional to twice the cell thickness, etc.

(2) Parasitic Capacitance

As shown in FIG. 15, in the case where a region extending to borders corresponding to the signal lines (the gate signal lines 122 and the source signal lines 121) is utilized for display in a transmission-type LCD device of the POP structure, a region 114 is naturally produced in which the pixel electrode 103b (indicated by the alternate long and short dash lines) is superimposed on the signal lines (the gate signal lines 122 and the source signal lines 121). Furthermore, in a reflection-type LCD device, such a superimposition region 114 (hatched region) has a greater width, since light from the front is also utilized thereby allowing the gate signal lines 122 and the source signal lines 121 to be used as a part of the pixel electrode 103b.

According to the region 114, a capacitance component called as parasitic capacitance is generated. The parasitic capacitance naturally increases as the region 114 in which the pixel electrode 103b is superimposed on the signal lines (the gate signal lines 122 and the source signal lines 121) is expanded, as expressed by the follow formula (1):

$$C = \in_r \cdot \in_o \cdot S / d \qquad (1)$$

where C represents parasitic capacitance, $\in_r$ represents a dielectric constant, $\in_o$ represents a dielectric constant in vacuum, S represents an area of the region of superimposition of the signal lines and the pixel electrode, and d represents a distance between electrodes.

A parasitic capacitance as above raises a problem of generation of cross-talk, loads on a driver, etc. Though it is possible to design a driver and an active element that allow the generation of a parasitic capacitance as above to be ignored, an increase in consumed electric power is induced in such a case, thereby impairing the advantage of low power consumption of the LCD device.

Considering the foregoing problems, it is necessary to reduce the parasitic capacitance. To reduce the parasitic capacitance, referring to the foregoing formula (1), the following means can be suggested: (i) to reduce the area S of the region of superimposition of the signal lines and the pixel electrode; (ii) to lower the dielectric constant $\in_r$ of the interlayer insulating film; and (iii) to widen the distance d between electrodes in the region of superimposition of the signal lines and the pixel electrode. However, the area S cannot be reduced so that the aperture ratio should not fall, and it is difficult to drastically lower the dielectric constant of an organic film with respect to that of the liquid crystal. Accordingly, to widen the distance d between electrodes is most effective.

Results of experiments conducted by the inventors of the present invention prove that, in the case where an organic film having a thickness substantially equal to that of the liquid crystal is used as the interlayer insulating film, the organic film having a thickness of not less than 3 μm or 4 μm would not adversely affect the display (does not cause cross-talk), while an increase in consumed power can be avoided. It is, however, very difficult to apply, by using the aforementioned spin coater, a film to a thickness of not less than 3 μm or 4 μm while not causing layer thickness distribution that would adversely affect the cell thickness of the liquid crystal. Besides, reduction of a film thickness, called "film thinning", that inevitably occurs in the development process and the like tends to increase the layer thickness distribution. Such layer thickness distribution also causes irregularity in light diffusion, called "reflection irregularity", particularly in the case where a reflection-type LCD device is produced, resulting in extreme deterioration of display performance.

(3) Fabrication of Reflection-Type LCD Device

A reflection-type LCD device utilizes light from the panel front in display by reflecting the light by means of reflection electrodes. In so doing, "white" display is carried out by utilizing a light diffusing function that is imparted to reflection electrodes. To do so, the interlayer insulating film surface is processed so as to have a pattern of projections and recesses. FIGS. 16(a) through 16(e) illustrate a process for forming projections and recesses on the surface of the interlayer insulating film.

(i) A surface of a glass substrate 101 on which the lower layer electrodes 105 are provided is coated with a photosensitive resin by spin coating, so that the interlayer insulating film 104 is formed with the photosensitive resin (see FIG. 16(a)).

(ii) An interlayer insulating film 104 is subjected to half-exposure by using a projection/recess-forming photo-mask 115 (see FIG. 16(b)).

(iii) Portions where the contact holes 106 are to be formed are exposed by using a contact-hole-forming photo-mask 110 (see FIG. 16(c)).

(iv) Exposed portions are removed by development (see FIG. 16(d)).

(v) Baking causes the interlayer insulating film 104 to be rid of sharp corners by heat, thereby making projections and recesses smoother (see FIG. 16(e)).

In the foregoing step (ii), to simplifying the process, projections and recesses on the surface of the interlayer insulating film 104 are formed by "half-exposure" process. The "half-exposure" process indicates a process of exposing a film made of a photosensitive resin so that, when the development process is completed, the film will still remain to some extent in regions where the resin should be removed, or in other words, so that the underneath of the photosensitive resin film will not be exposed. By adopting the foregoing half-exposure process, the interlayer insulating film 104 will have a cross section as shown in FIG. 16(d) at the completion of development, and this makes it easier to form smooth projections and recesses by the subsequent baking. However, by adopting the foregoing process while forming the interlayer insulating film 104 thicker, the following problems arise.

(a) Since the part remaining after the development is thick under the projections and recesses, the film is flatten by baking (see FIG. 17(a)).

(b) Projections and recesses can be realized to some extent by intensifying exposing light, but the flattening occurs since the projections and recesses become smoother due to the baking. Consequently, the film thickness decreases (see FIG. 17(b)).

(c) Assume a case where, to suppress occurrence of parasitic capacitance, the interlayer insulating film 104 is let to remain on the signal lines (the gate signal lines 122 and the source signal lines 121), while patterns of projections and recesses are not provided on its surface. In this case, regions having the projections/recesses-formed patterns and regions having the signal lines differ in height (see FIG. 17(c)). As a result, the cell thickness in pixel regions increases, switching domains are produced, and other problems arise.

As described above, it is very difficult to establish a process to satisfy both the "half-exposure" process and the thickening of the interlayer insulating film, as well as margins in the process are narrow.

(4) Fabrication of Hybrid-Type LCD Device

FIG. 18(a) illustrates a basic structure of a hybrid-type LCD device. In the foregoing hybrid-type LCD device, retardation R1 of a liquid crystal layer 118 of a transmission region 108, and retardation R2 of a liquid crystal layer 118 of a reflection region 107 are obtained by the following formulae:

$$R1 = \Delta n \cdot d1 \tag{2}$$

$$R2 = \Delta n \cdot 2 \cdot d2 \tag{3}$$

where R1 represents retardation in the transmission region, R2 represents retardation in the reflection region, Δn represents refractivity anisotropy, d1 represents a cell thickness in the transmission region, and d2 represents a cell thickness in the reflection region.

The retardations R1 and R2 in the respective regions vary with the cell thicknesses d1 and d2, respectively, as shown in the foregoing formulae (2) and (3). In other words, the voltage-transmissivity (reflectance) characteristics vary with the cell thicknesses d1 and d2, respectively. Incidentally, FIG. 18(a) illustrates the hybrid-type LCD device in a normally black mode. In FIG. 18(a), 116 is a polarizing element, and 117 is a backlight.

FIG. 18(b) illustrates voltage-transmissivity characteristic of the transmission region 108. The voltage-reflectance characteristic in the reflection region 107 has greater variation of retardation as compared with that in the transmission region 108, as shown in FIG. 18(c), in the case where the cell thickness d1 in the transmission region 108 satisfies the following relationship with respect to the cell thickness d2 in the reflection region 107:

$$d1 < 2 \cdot d2 \tag{4}$$

On the other hand, the voltage-reflectance characteristic in the reflection region 107 is substantially identical to that in the transmission region 108, as shown in FIG. 18(d), in the case where the cell thickness d1 in the transmission region 108 satisfies the following relationship with respect to the cell thickness d2 in the reflection region 107:

$$d1 = 2 \cdot d2 \tag{5}$$

For this reason, the interlayer insulating film 104 of the reflection region 107 is formed substantially as thick as the cell thickness d2, and the cell thickness d1 of the transmission region 108 is set to twice the cell thickness d2 of the reflection region 107. This allows optical characteristics to become consistent. However, considering the liquid crystal cell thickness is about 3 to 5 μm, the interlayer insulating film 104 need be formed thick. This however cannot be achieved by spin coating as described above.

SUMMARY OF THE INVENTION

The object of the present invention is to provide an LCD device fabrication method that decreases film thickness distribution in the interlayer insulating film thereby allowing a stable cell thickness to be obtained, and further, that facilitates to thicken the interlayer insulating film.

To achieve the foregoing object, an LCD device fabrication method in accordance with the present invention is a fabrication method of liquid crystal display device having a pair of substrates which are provided vis-a-vis each other and between which a liquid crystal layer is provided, at least one of the substrates being a transparent substrate having transmissivity, the other substrate that is a back substrate provided vis-a-vis the transparent substrate being provided with pixel electrodes with an interlayer insulating film intervening the back substrate and the pixel electrodes, pixel electrodes being respectively connected with lower layer electrodes through contact holes formed in the interlayer insulating film, and the method is characterized by including the steps of (a) forming signal lines and the lower layer electrodes on the back substrate, (b) forming an interlayer insulating film on the back substrate by using a dry film resist, (c) forming contact holes at positions corresponding to the lower layer electrodes by patterning the interlayer insulating film to a predetermined pattern, and (d) forming pixel electrodes on the interlayer insulating film.

According to the foregoing method, in fabrication of an LCD device of the POP structure in which an interlayer insulating film is formed between pixel electrodes and a back substrate on which the pixel electrodes are provided, the interlayer insulating film is formed with a dry film resist. Therefore, it is possible to easily form an interlayer insulating film that has very small film thickness distribution inside the face of the back substrate, as well as that is formed thick. This is because that an interlayer insulating film is formed with use of a film having a uniform and desiredly great thickness.

Furthermore, for example, in the case where a conventional spin coater is used to form the interlayer insulating film, most of the resist dropped first time is spilt by centrifugal force to outside the substrate, thereby resulting in that a very small amount of the same actually remains on the substrate, but application of a dry film resist in forming the interlayer insulating film as in the present invention enables reduction of wasted materials, thereby ensuring that an increase in costs should be suppressed.

This further enables to decrease display defects that occur due to irregularities in the cell thickness. Furthermore, costs can be reduced since materials can be saved as compared with the case where the spin coater is used.

For a fuller understanding of the nature and advantages of the invention, reference should be made to the ensuing detailed description taken in conjunction with the accompanying drawings.

BRIEF DESCRIPTION OF THE DRAWINGS

FIGS. 13(a) through 13(e) are process views schematically illustrating steps for fabricating a pixel substrate, in a process for fabricating a conventional LCD device.

DESCRIPTION OF THE PREFERRED EMBODIMENTS

[First Embodiment]

Figures 1A, 1B:
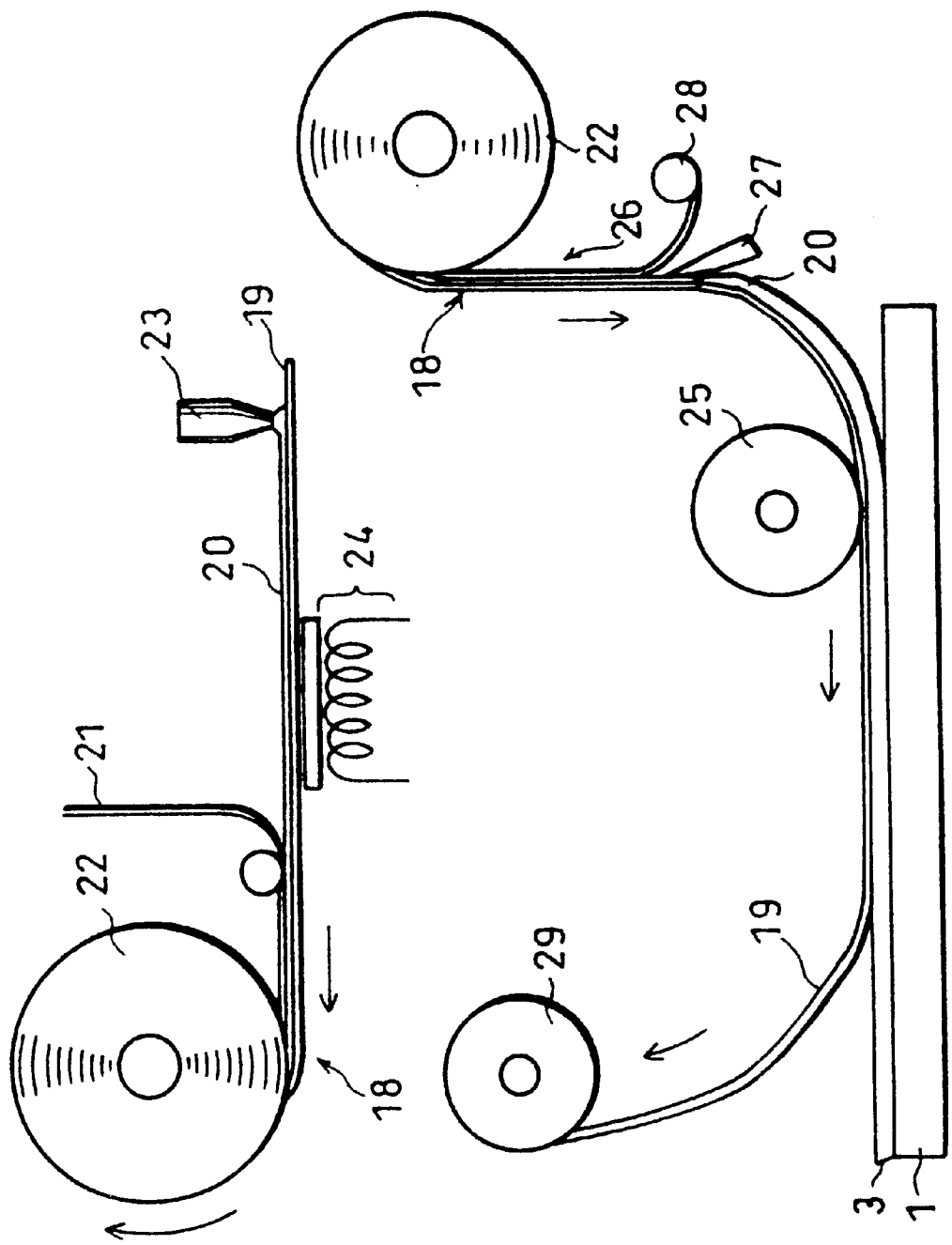
FIG. 1(a) is an explanatory view schematically illustrating a step for forming a dry film resist, in a process for fabricating an LCD device in accordance with the first embodiment of the present invention.
FIG. 1(b) is an explanatory view schematically illustrating a step for forming an interlayer insulating film with the foregoing dry film resist.

The following description will explain a first embodiment of the present invention, while referring to FIGS. 1 through 3 and 8. Note that the following description of the present embodiment will explain a method for fabricating a transmission-type LCD device of the POP (pixel on passivation) structure.

FIGS. 2(a) through 2(e) illustrate a process for fabricating a transmission-type LCD device of the POP structure. Note that to avoid complexity in the drawings, thin film transistors (hereinafter referred to as TFTs) used as switching elements, signal lines, etc. are omitted. The process for fabricating the transmission-type LCD device of the POP structure is as follows.

(i) A photosensitive resin film as an interlayer insulating films 3 is formed with a dry film resist on a glass substrate (back substrate) 1 on which lower layer electrodes 2 as transparent electrodes made of ITO (indium tin oxide) are provided (see FIG. 2(a))

(ii) The interlayer insulating film 3 is exposed with use of a photo-mask 6 shown in FIG. 8(a) (black portions: light blocking regions, white portions: light transmitting regions) so that contact holes 4 are formed for connecting the foregoing lower layer electrodes 2 and pixel electrodes S that will be formed in a later step (see FIG. 2(b)).

(iii) The interlayer insulating film 3 and the contact holes 4 are finished through development and baking steps (see FIG. 2(c)).

(iv) The ITO film that will become the pixel electrodes 5 is provided on the foregoing interlayer insulating film 3 (see FIG. 2(d)).

(v) The foregoing ITO film is shaped into a predetermined pattern, so that the pixel electrodes 5 are formed (see FIG. 2(e)).

Incidentally, the foregoing lower layer electrodes 2 are not necessarily made of ITO. It may be made of a non-transparent metal film.

Figure 2:
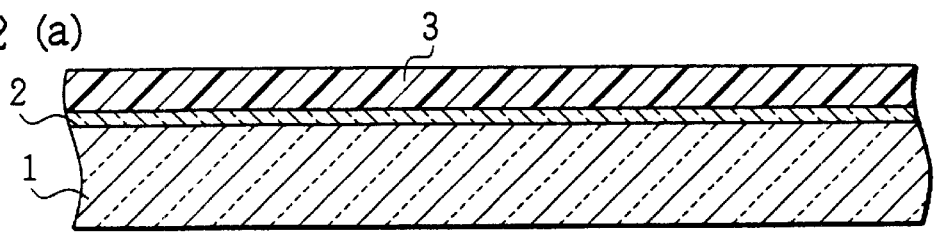
FIGS. 2(a) through 2(e) are process views schematically illustrating a process for fabricating a pixel substrate in the foregoing process for fabricating the LCD device.
Figure 2:
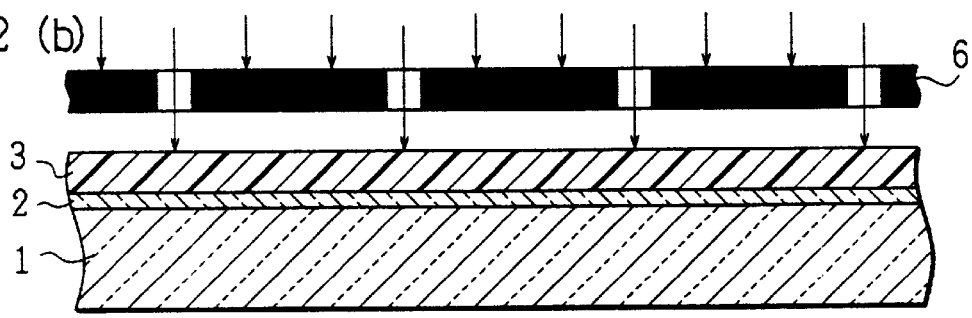
Figure 2:
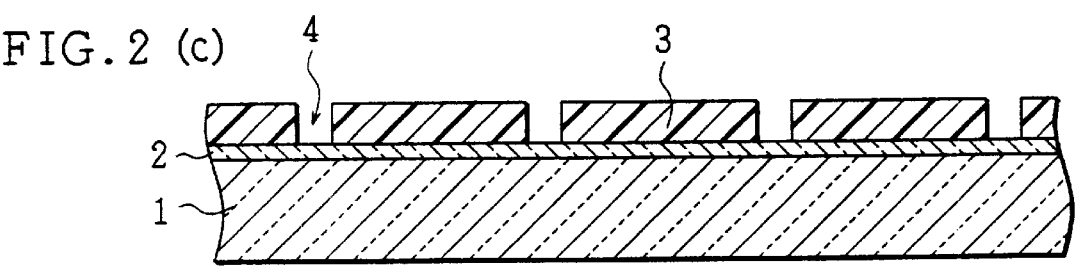
Figure 2:
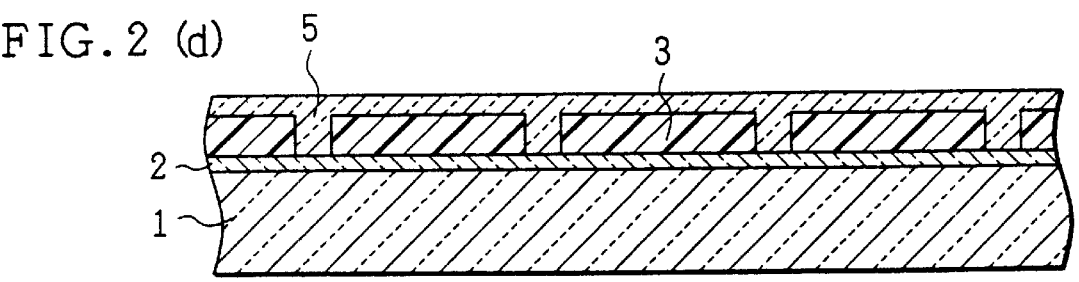
Figure 2:
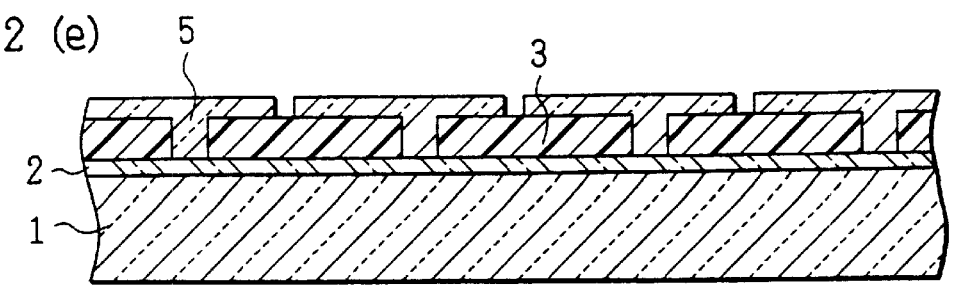
Figure 3:
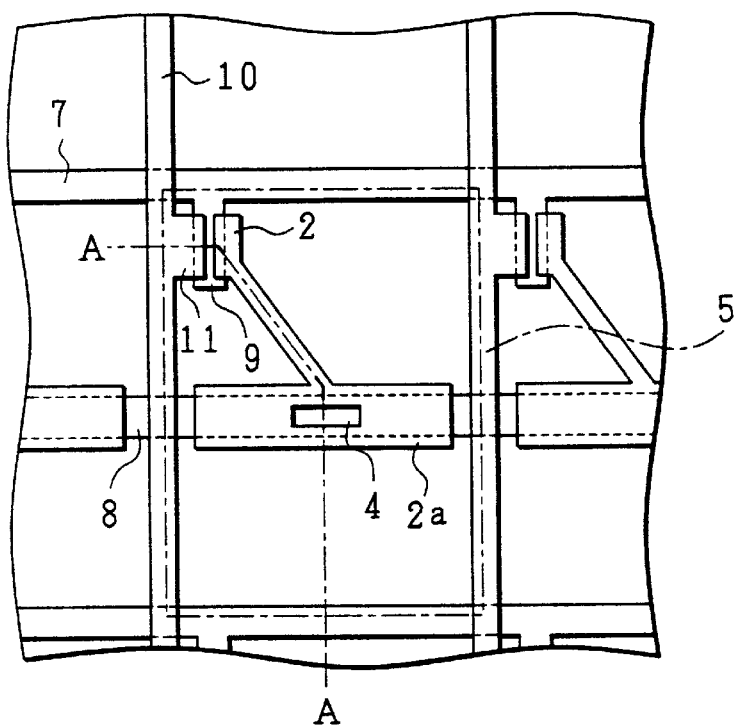
FIG. 3(a) is a plan view illustrating an arrangement of the pixel substrate corresponding to one pixel and its surroundings.
FIG. 3(b) is a cross-sectional view of FIG. 3(a) taken along an A—A line.
Figure 3:
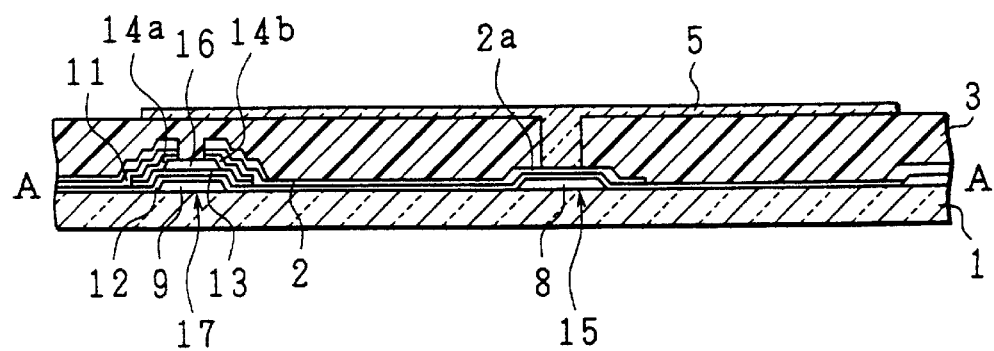
Figure 4:
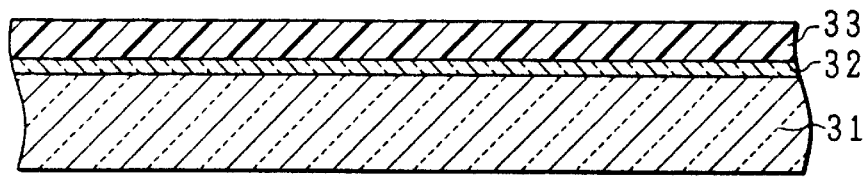
FIGS. 4(a) through 4(g) are process views schematically illustrating a process of producing a projections/recesses-forming mold used in forming a dry film resist, in a process for fabricating an LCD device in accordance with the second embodiment of the present invention.
Figure 4:
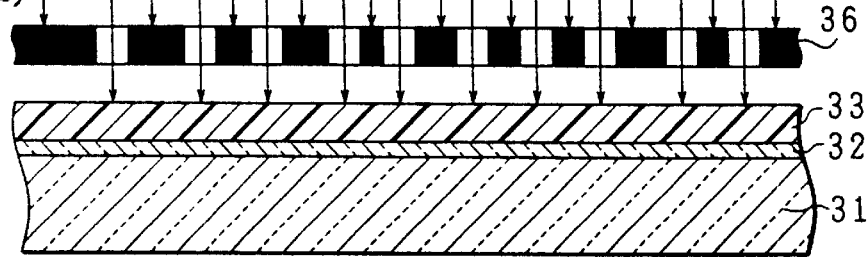
Figure 4:
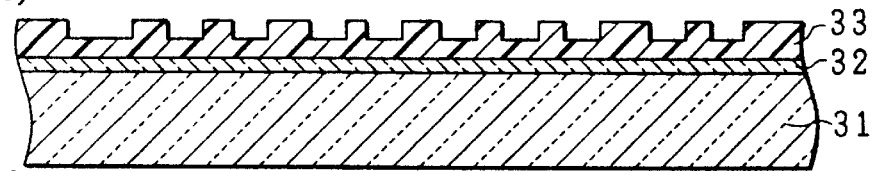
Figure 4:
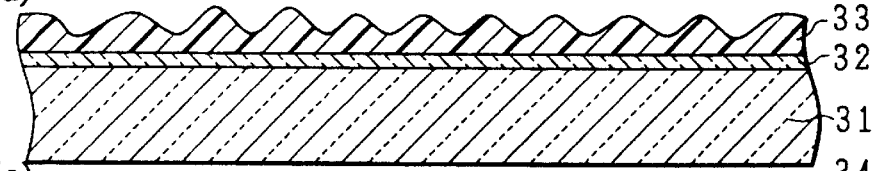
Figure 4:
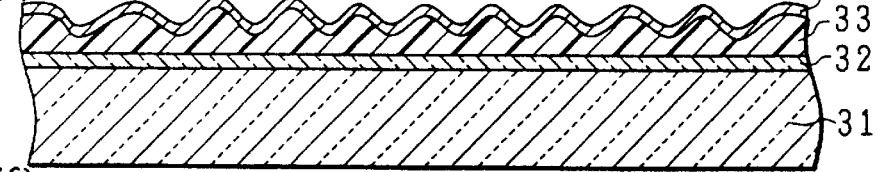
Figure 4:
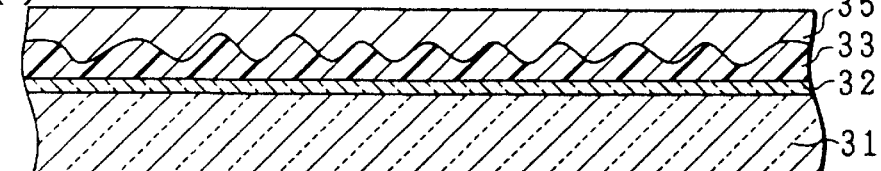
Figure 4:

FIG. 3(a) illustrates a plan view of a region of a pixel substrate of the transmission-type LCD device finished through the foregoing process corresponding to one pixel and its surroundings, and FIG. 3(b) is a cross-sectional view of FIG. 3(a) taken along an A—A line. Note that the TFTs and signal lines that are omitted in FIG. 2 are shown in FIGS. 3(a) and 3(b).

A plurality of gate signal lines 7 and supplementary capacitor forming signal lines 8 are provided substantially parallel with each other on the glass substrate 1. A gate electrode 9 branches out of each foregoing gate signal line 7. Source signal lines 10 are provided so as to cross the gate signal lines 7 at right angles with a gate insulating film 12 provided between the signal lines 7 and 10. From the source signal lines 10, a source electrode 11 branches out at each pixel. The gate insulating film 12 is a layer provided over substantially an entirety of a surface of the glass substrate 1 so as to cover the gate signal lines 7, the source signal lines 10, and the supplementary capacitor forming signal lines 8.

The source electrode 11 is superimposed on an edge part on one side of the gate electrode 9, though the gate insulating film 12, an a-Si layer 13 that will be described later, and an n$^+$a-Si layer 14a as a contact layer intervene between the source electrode 11 and the gate electrode 9. The foregoing a$^+$-Si layer 13 is a layer provided over the gate electrode 9, with the gate insulating film 12 provided therebetween.

On an edge part on the other side of the gate electrode 9, the lower layer electrode 2 is superimposed, though the gate insulating film 12, the a-Si layer 13, and an n$^+$a-Si layer 14b as a contact layer intervene the gate electrode 9 and the lower layer electrode 2. The foregoing lower layer electrode 2 extends to above the supplementary capacitor forming signal line 8. An extension portion 2a of the lower layer electrode 2 and the supplementary capacitor forming signal line 8 are provided vis-a-vis each other, with the foregoing gate insulating film 12 provided therebetween, thereby forming a supplementary capacitor 15. A member 16 above the foregoing a-Si layer 13 is an etch-stopper.

Incidentally, each of the TFTs 17 as switching elements for selectively driving the pixel electrodes 5 is composed of the foregoing gate electrode 9, source electrode 11, lower layer electrode 2, etc.

The pixel electrode 5 (indicated by alternate long and short dash lines in FIG. 3(a)) is provided above the foregoing TFT 17 and lower layer electrode 2, though the interlayer insulating film 3 intervenes therebetween.

The following description will explain a process for forming the interlayer insulating film 3 in the method for fabricating an LCD device in accordance with the present embodiment.

In the method for fabricating an LCD device in accordance with the present embodiment, a dry film resist is used to form the interlayer insulating film 3 in the step (i) described above. The following description will explain a method for forming the interlayer insulating film 3 with a dry film resist, while referring to FIGS. 1(a) and 1(b).

As shown in FIG. 1(a), a dry film resist 18 is obtained through the following process. A photosensitive resin 20 is uniformly applied on a transparent base film 19 that is made of, for example, PET (polyethylene terephthalate) by means of a coating device such as a slit coater, through a photosensitive resin coating protective slit 23. The resin is dried 5 minutes at a temperature of 100° C. by means of a heater 24. Finally, on a surface of the photosensitive resin 20, a protective film layer 21 made of polyethylene terephthalate is further provided. The foregoing protective film layer 21 is provided so as to prevent damage from outside to, or adhesion of foreign materials from outside to, the photosensitive resin 20. The dry film resist 18 thus formed is rolled up, thereby becoming a rolled dry film resist 22. Incidentally, a material used as the photosensitive resin 20 is not particularly limited, and any known material can be used, but an acryl-base photosensitive resin material is preferably used.

Next, the dry film resist 18 arranged as above is transferred onto the glass substrate on which the TFTs 17 and the lower layer electrodes 2 are provided, by means of a vacuum laminator. Examples of the vacuum laminator include VACUUM LAMINATOR TYPE VCL of ANGER ELECTRONIC available from GMBH Corp. FIG. 1(*b*) schematically illustrates a process of transferring the dry film resist 18 onto the glass substrate 1 by means of the foregoing vacuum laminator. Incidentally, the TFT 17 and the lower layer electrode 2 formed on the foregoing glass substrate 1 are omitted in FIG. 1(*b*).

In FIG. 1(*b*), between a transfer (heating/pressing) roller 25 and a rolled dry film resist 22, tension is applied to the dry film resist 18 so that the dry film resist 18 should not be warped or crinkled at a region 26 for introducing the dry film resist 18 (hereinafter referred to as an introducing region 26). Warps and crinkles cause the photosensitive resin 20 (a layer to function as a resist layer after transfer) to be irregularly applied and to catch bubbles therein upon transfer of the photosensitive resin 20 to the glass substrate 1. The aforementioned application of tension is to prevent such irregular application and catching of bubbles due to warps and crinkles. Incidentally, the tension is appropriately adjusted depending on the material of the applied photosensitive resin 20 and the size of the glass substrate 1 on which the dry film resist 18 is transferred.

The dry film resist 18 is guided in the vicinity of the glass substrate 1. The protective film 21 is separated therefrom by a protective film separator 27 immediately before transfer to the glass substrate 1, and the photosensitive resin 20 is heated and pressed against the glass substrate 1 by a transfer roller 25, resulting in that the interlayer insulating film 3 is formed. Incidentally, the protective film 21 separated is rolled up by a protective film winding roller 28. The base film 19 left after transfer of the photosensitive resin 20 is rolled up by a base film winding roller 29.

The glass substrate 1 on which the interlayer insulating film 3 is provided through the foregoing process is subjected to the above-described steps (ii) through (V) with reference to FIGS. 2(*b*) through 2(*e*). Consequently, it is completed as a pixel substrate of a transmission-type LCD device of the POP structure.

Advantages achieved by using the dry film resist 18 in forming the interlayer insulating film 3 as in the fabricating method in accordance with the present embodiment include the following. First of all, since wasted materials are reduced as compared with the case where a spin coater is used, costs can be decreased. Namely, cost merit can be achieved regarding materials used. To be more specific, in the case of use of a spin coater, most of the resist dropped first time is spilt by centrifugal force to outside the glass substrate 1, thereby resulting in that a very small amount of the same remains on the glass substrate 1. Thus, most of the resist dropped first time is wasted. Conversely, the use of the dry film resist 18 does not cause such waste of resist. Next, an interlayer insulating film 3 superior in uniformity of the film thickness can be obtained, as compared with the case where a spin coater is used.

Indeed, the film thickness of the photosensitive resin 20 laminated on the base film 19 also varies at the beginning and end of the laminated area. But, since the dry film resist 18 that is very long is rolled up into the rolled dry film resist 22, portions corresponding to the beginning and end of the photosensitive resin 20-laminated area are very small in proportion, on the very long base film 19. Accordingly, non-use of the portions corresponding to the beginning and end at which the film thickness varies will hardly cause demerit regarding costs, and moreover, a quantity of materials incomparably greater than that in the case where the spin coater is used can be saved.

Furthermore, since the solvent is vaporized by the heater 24 shown in FIG. 1(*a*) at a stage where the photosensitive resin 20 is applied onto the base film 19, vaporization of the solvent need not be carried out on the glass substrate 1, unlike in the case of application by spin coating. In other words, since the drying has been carried out to some extent beforehand, irregularly dried portions of the film, if any, may not be used, so that adverse affects to panels should be avoided.

Furthermore, in the present embodiment, a film can be formed thick, to a thickness of 3 $\mu$m to 6 $\mu$m, since the photosensitive resin 20 is applied by means of an applicator such as a slit coater. Besides, since the photosensitive resin 20 that has already been formed uniform in thickness on the base film 19, difference in film thickness does not occur between the center and the periphery of the glass substrate 1, unlike in the case where a spin coater is used.

As described above, by forming the interlayer insulating film 3 with a photosensitive resin material by using the dry film resist 18, it becomes possible to achieve uniformity in the interlayer insulating film 3 on one substrate and to make the interlayer insulating film 3 thicker, that has been difficult by spin coating. Furthermore, the formation of the contact holes 4 and the like can be realized through a photolithography process, as conventionally.

Incidentally, the present embodiment is explained with reference to a case where a positive-type resist that allows portions exposed to light to be removed, but needless to say, it is possible to use a negative-type resist that allows portions exposed to light to remain.

[Second Embodiment]

The following description will explain a second embodiment of the present invention, while referring to FIGS. 4 through 6, and 8. Note that the following description of the present embodiment will be explained with reference to a method for fabricating a reflection-type LCD device of the POP structure. Pixel electrodes in the foregoing reflection-type LCD device are reflection electrodes having projections and recesses on their surfaces. For conveniences' sake, the members having the same structure (function) as those in the above-mentioned first embodiment will be designated by the same reference numerals and their description will be omitted.

In the present embodiment a dry film resist 40 is formed in the following manner: projections and recesses are formed on a surface of a base film 19 on which the photosensitive resin 20 is to be applied, and the dry film resist 40 is formed with, as the photosensitive resin 20, a photosensitive resin material that is less subject to deformation due to heat. The following description will explain a method for forming the dry film resist 40.

As described above, formation of the interlayer insulating film through the process of the spin coating, the half-exposure, and the process for getting rid of sharp corners by heat (hereinafter simply referred to as heat treatment process) tends to cause a problem that stability (reproductivity) cannot be achieved since the interlayer insulating film tends to have variation of thickness in one substrate. Furthermore, since differences in height in the projections and recesses formed on the surface of the reflection electrode are determined according to the exposure level, steps of spin coating and photolithography repeated several times are indispensable, as to the fabrication process, in the case where projections and recesses that are random in height are required. To carry out the foregoing steps with respect to each panel (substrate) is not practical from the viewpoint of productivity.

Furthermore, the following description will explain one of the problems relating to the heat treatment process. In the case where projections and recesses formed on the reflection electrodes are formed through a heat treatment process as described above, a device suitably adopted as an exposing device in the photolithography step for the process is a so-called "stepper" that provides light from a light source (hereinafter referred to source light) with an excellent degree of parallelization. In the case of the foregoing device, however, exposed by the device is an area in a several-inch-diagonal panel size. On the other hand, a large-size glass called as a mother glass that is usually used in the normal fabrication process has a size of not smaller than 300 mm×300 mm, much greater than the area exposed by the stepper at once.

Besides, even with the stepper, the source light is not necessarily completely parallel throughout the exposed area, and light quantity distribution and parallelization distribution slightly occur. Such distributions tend to occur to peripheries of the exposed area. In the case where adjacent regions adjoin each other in the foregoing area (in the vicinity of peripheries of the exposed area), the regions define a boundary therebetween: this was confirmed by the inventors of the present application. As long as such a boundary is present, dry film resists with projections and recesses need be formed so as to respectively conform to a plurality of panel formation regions that are to compose one large-size substrate (mother glass), and these dry film resists need be laminated on the substrate so as to conform to patterns on the substrate. In the case of an LCD device with a large screen, even the foregoing method cannot be applied, and boundary lines between the exposed areas occur to the screen.

To solve the foregoing problems, a technique for adjoining exposed areas in a manner such that boundary lines are not produced has been developed, like the techniques disclosed in the U.S. Pat. No. 5,973,843 (Date of Patent: Oct. 26, 1999) and the Japanese Publication for Laid-Open Patent Application No. 7032/1999 (Tokukaihei 11-7032 (Date of Publication: Jan. 12, 1999)). This enables to form projections and rejections throughout an entirety of a surface of a mother glass. This is applicable to an LCD device having a screen larger than an area exposed by the stepper at once (in the extreme case, an LCD device whose panel size corresponds to a size of one mother glass), but a complex and varied "conditioning" is still required.

Furthermore, without the techniques disclosed in the U.S. Pat. No. 5,973,843 and Tokukaihei 11-7032, it is possible to eliminate boundary lines by utilizing only a part of the source light of the stepper that has particularly small distribution in light quantity and parallelization in carrying out exposure. The most serious problem in the case where the foregoing method is applied in the conventional process, however, is that the number of times of exposure per one substrate extremely increases. Such an increase in the number of times of exposure (the number of times of shot) leads to an increase in a processing time per one substrate, thereby resulting in a drastic decrease in a throughput. Therefore, application of the foregoing method to actual production is not practical.

It is, however, possible to experimentally produce an optimum shape only once (several times) by utilizing any one of the foregoing methods. In the case where produced one is to be used as a master for forming a base film of a dry film resist like in the foregoing embodiment, it may be formed by any one of the foregoing methods only once. By so doing, the reflection-type electrode fabrication process can be realized as is the case with the aforementioned fabrication process of the first embodiment.

More specifically, once the master is produced, no more subsequent steps are needed for fabricating reflection-type LCD devices actually. To the contrary, remarkably stable production can be realized, as compared with the conventional "heat treatment process". Furthermore, by producing the dry film resist by means of a master having the highest perfectivity, production of a reflection electrode having the highest perfectivity is made possible always. Thus, an immense effect can be achieved, as compared with the conventional "heat treatment process".

For example, the base film for the dry film resist may be produced by the process of the First Embodiment, by using a substrate as a master that has no boundary line and on that projections and recesses are formed by the technique disclosed by the U.S. Pat. No. 5,973,843 or the Tokukaihei 11-7032. By so doing, the dry film can be easily transferred on a panel formation region inside a mother glass without position adjustment therebetween as described above. Consequently, the same dry film resist is always applicable irrelevant to the panel size, pixel pitch, etc. of the panel to be fabricated, and this is an extremely great advantage for the fabrication process.

As described above, by introducing a dry film resist process in the reflection electrode fabrication process, severe drawbacks of the conventional "heat treatment process" in aspects of productivity and reproducibility can be solved at once.

The following description will explain a method for producing a mold for the foregoing substrate with projections and recesses, while referring to FIGS. 4(a) through 4(g). Note that the process for producing a substrate with projections and recesses as an original is explained by way of example with reference to a case where the half-exposure and the "heat treatment process" are carried out once each, but needless to say, it is possible to carry out these processes several times.

(i) A glass substrate 31 on which lower layer electrodes 32 are provided is coated with a photosensitive resin 33 by spin coating (see FIG. 4(a)).

(ii) The photosensitive resin 33 is subjected to half-exposure with use of a photo-mask 36 shown in FIG. 8(b) (black portions: light blocking regions, white portions: light transmitting regions) (see FIG. 4(b)).

(iii) Development is carried out (see FIG. 4(c)).

(iv) Baking at 200° C. for one hour is carried out, to get rid of sharp corners by heat (see FIG. 4(d)).

(v) Ni (nickel) is deposited by sputtering as a metal film for electrocasting, whereby an electrocasting-use Ni layer 34 is formed (see FIG. 4(e)).

(vi) Ni electrocasting (anode: electrolytic Ni, plating path: $Ni-SO_4-NH_4Cl-H_3BO_3$) is carried out, so that a projections/recesses-forming mold (projections/recesses-forming master) 35 is produced (see FIG. 4(f)).

(vii) The projections/recesses-forming mold 35 is finished (see FIG. 4(g)).

Here, in a substrate having projections and recesses as an original substrate that is used for producing the foregoing projections/recesses-forming mold 35, a region not having defects such as reflection irregularity, film thickness irregularity, and foreign materials is preferably selected so as to be used.

A process for forming a dry film resist 40 by using as an original the projections/recesses-forming mold 35 thus formed will be explained below, with reference to FIGS. 5(*a*) and 5(*b*).

Figure 5:
FIGS. 5(a) and 5(b) are process views schematically illustrating steps for forming a dry film resist by means of the foregoing projections/recesses-forming mold.
Figure 5:
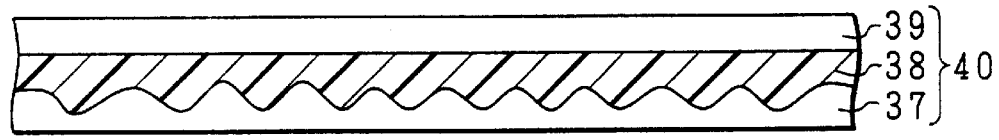

(i) Projections and recesses of the projections/recesses-forming mold 35 are copied to the base film 37 composed of a PET film or the like (see FIG. 5(*a*)).

(ii) A photosensitive resin film 38 and a protective film 39 are formed on the foregoing base film 37 by the same method as that shown with reference to FIG. 1(*a*) in conjunction with the first embodiment, whereby the dry film resist 40 is formed (see FIG. 5(*b*)).

Next, the following description will explain a process for forming a pixel substrate of a reflection-type LCD device by using the dry film resist 40 formed as described above, while referring to FIGS. 6(*a*) through 6(*e*).

Figure 6:
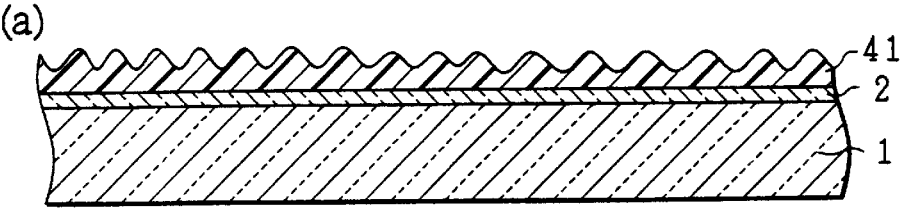
FIGS. 6(a) through 6(e) are process views schematically illustrating steps for fabricating a pixel substrate, in the foregoing process for fabricating an LCD device.
Figure 6:
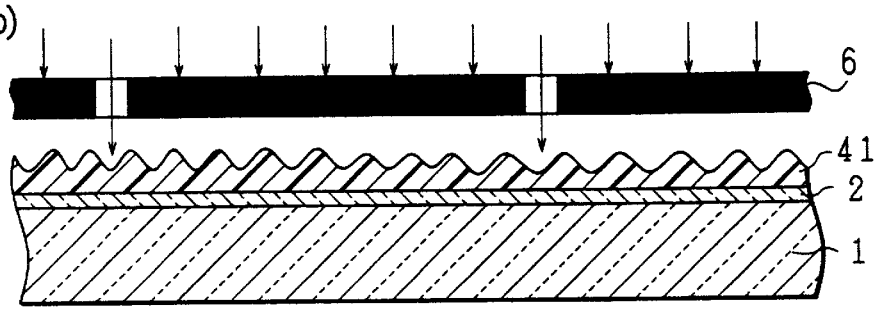
Figure 6:
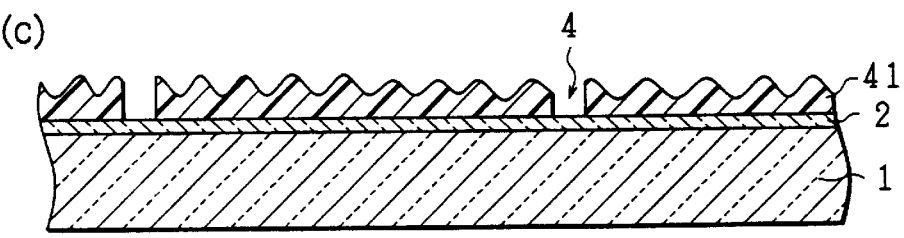
Figure 6:
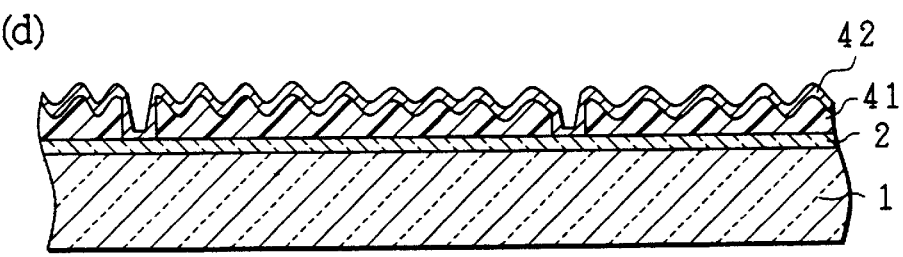
Figure 6:
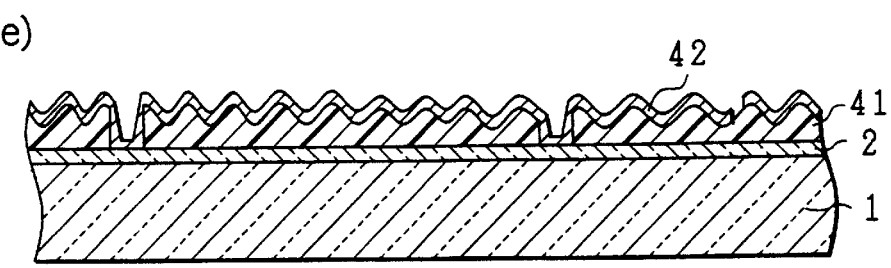

(i) On the glass substrate 1 on which the lower layer electrodes 2 are provided, an interlayer insulating film 41 is formed, by transferring the photosensitive resin 38 onto the glass substrate 1 by means of the dry film resist 40, in the same manner as in the case of the method shown in FIG. 1(*b*) in conjunction with the first embodiment (see FIG. 6(*a*)).

Figure 8:
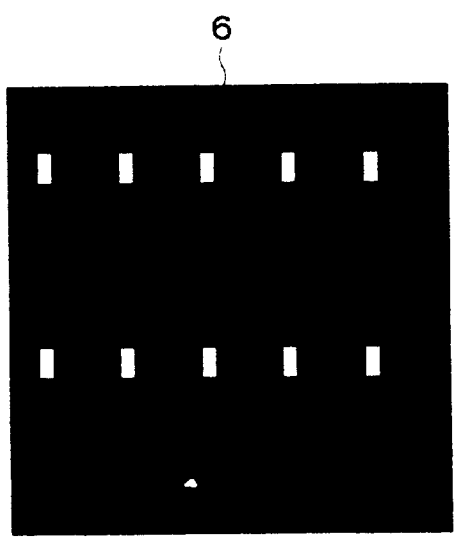
FIG. 8(a) is a plan view illustrating a photo-mask used in forming an interlayer insulating film in the first and second embodiments.
FIG. 8(b) is a plan view illustrating a photo-mask used in forming an interlayer insulating film in the second and third embodiments.
FIG. 8(c) is a plan view illustrating a photo-mask used in forming an interlayer insulating film in the third embodiment.
Figure 8:
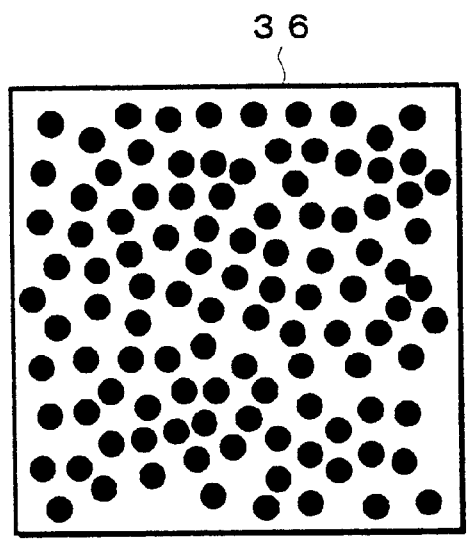
Figure 8:
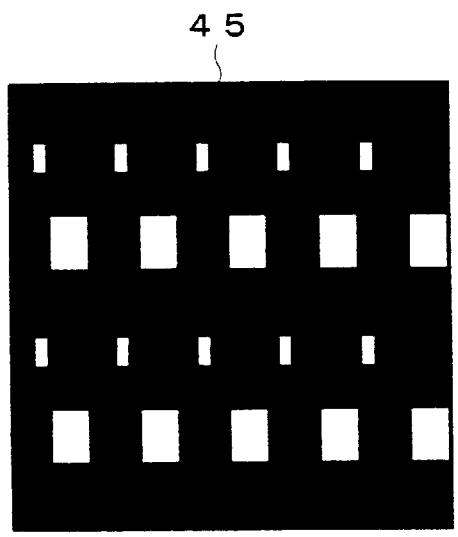

(ii) The interlayer insulating film 41 is exposed with use of a contact-hole-forming photo-mask 6 shown in FIG. 8(*a*) (see FIG. 6(*b*)).

(iii) Contact holes 4 are formed by development and baking (see FIG. 6(*c*)).

(iv) An aluminum (Al) film that will be processed into reflection electrodes 2 is formed by means of a sputtering device (see FIG. 6(*d*)). Here, in the case where the lower layer electrodes 42 are made of ITO, a molybdenum (Mo) layer as a barrier metal is formed beneath the Al film, though not shown, to prevent electric corrosion with the reflection electrodes 42.

(v) The reflection electrodes 42 are formed into a predetermined pattern by the photolithography and etching steps (see FIG. 6(*e*)).

Through the foregoing process, a pixel substrate of a reflection-type LCD device is completed. Incidentally, in the present embodiment, an arrangement in which the foregoing lower layer electrodes 2 are formed with a metal such as Ti or Ta while the foregoing barrier metal is not formed may be applicable.

Incidentally, the interlayer insulating film 41 formed by the method in accordance with the present embodiment differs from the interlayer insulating film 3 formed by the LCD device fabricating method in accordance with the first embodiment in only that projections and recesses are produced on a surface of the interlayer insulating film 3. Therefore, the interlayer insulating film 41 formed by the method in accordance with the present embodiment has the same advantage as that described in the description of the first embodiment.

Furthermore, since flattening of projections and recesses by the heat treatment can be avoided according to the reflection-type LCD device fabricating method in accordance with the present embodiment, optimal surface formation and thickening of the interlayer insulating film can be achieved at the same time.

Furthermore, the reflection-type LCD device fabricating method in accordance with the present embodiment provides excellent reproducibility (stability of the process), as compared with the case where the interlayer insulating film 41 is formed by the half-exposure and heat treatment processes that greatly depend on individual devices and conditions of fabrication.

Furthermore, by using a material that is less changeable due to heat as the photosensitive resin 38, baking can be carried out in a state in which the photosensitive resin 38 maintains projections and recesses according to the base film 37.

Incidentally, the present embodiment is explained with reference to a case where a positive-type resist that allows portions exposed to light to be removed, but needless to say, it is possible to use a negative-type resist that allows portions exposed to light to remain.

[Third Embodiment]

Figure 7:
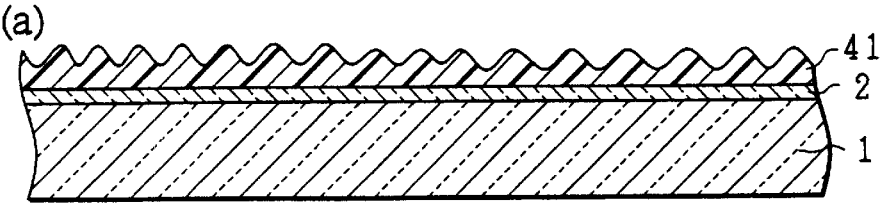
FIGS. 7(a) through 7(e) are process views schematically illustrating steps for fabricating a pixel substrate, in a process for fabricating an LCD device in accordance with the third embodiment of the present invention.
Figure 7:
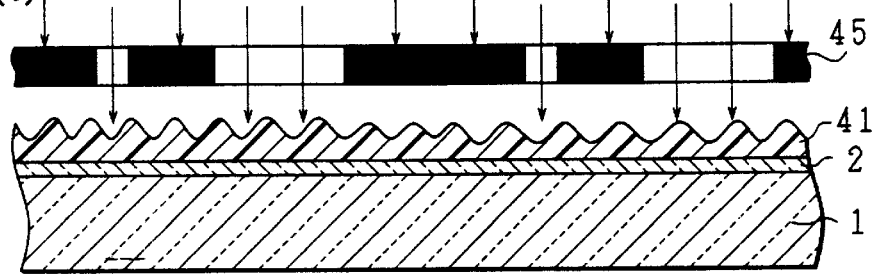
Figure 7:
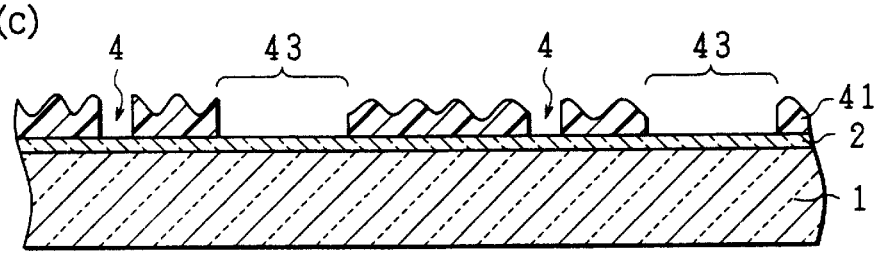
Figure 7:
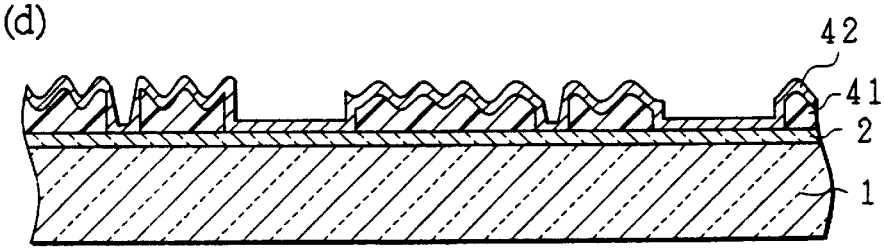
Figure 7:
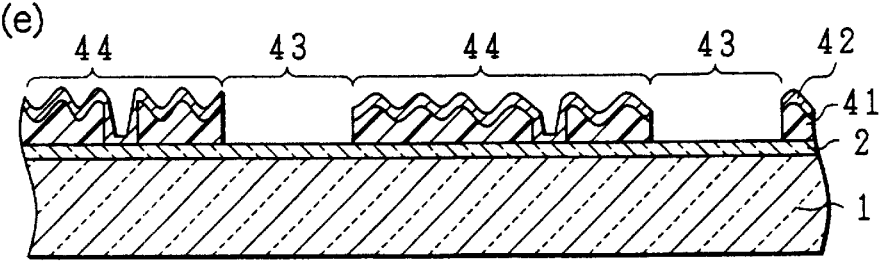
Figure 9:
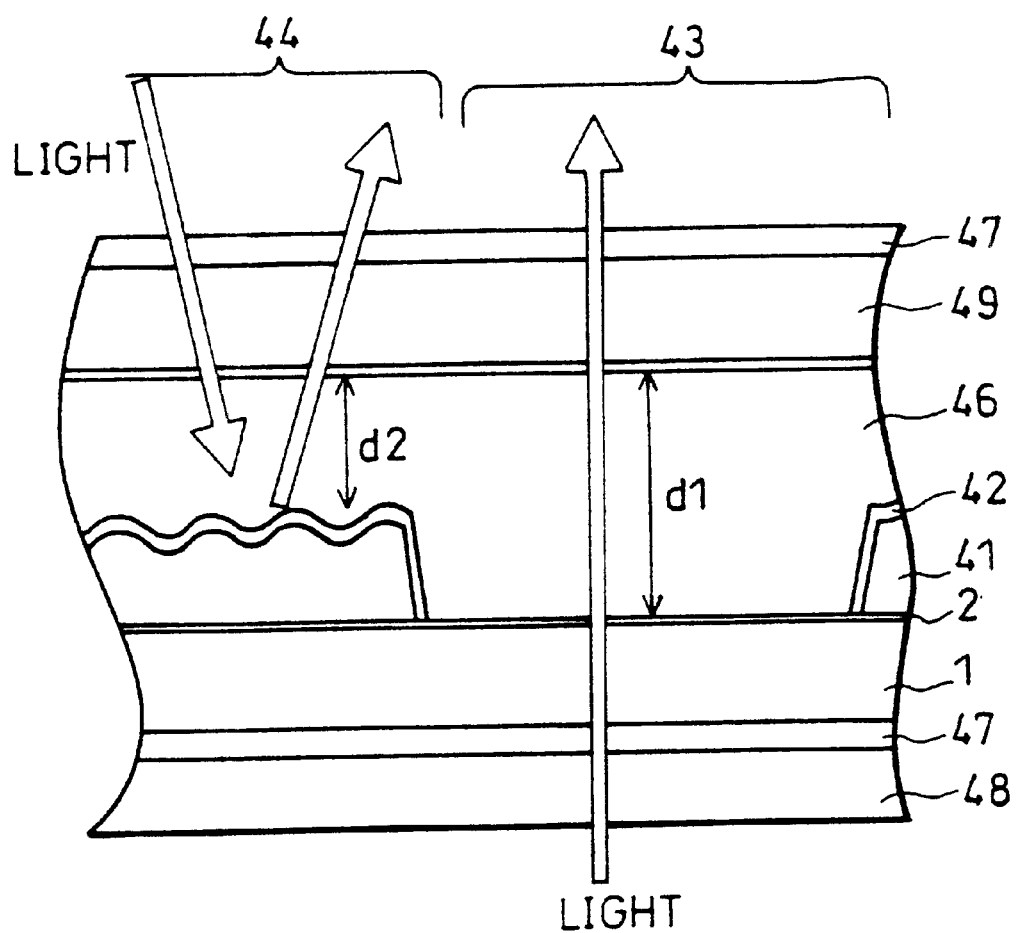
FIG. 9 is an explanatory view schematically illustrating a cross section of a hybrid-type LCD device fabricated through the foregoing fabrication process.
Figure 10:
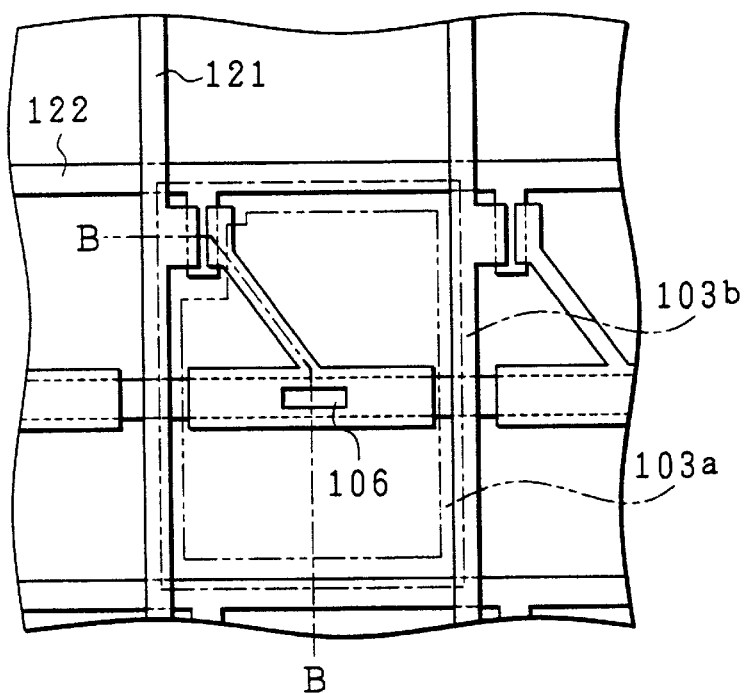
FIG. 10(a) is an explanatory view regarding comparison between pixel electrodes of a conventional LCD device of non-POP structure and those of a conventional LCD device of POP structure.
FIG. 10(b) is a cross-sectional view of the conventional LCD device of non-POP structure taken along a B—B line in FIG. 10(a)
FIG. 10(c) is a cross-sectional view of the conventional LCD device of POP structure taken along a B—B line in FIG. 10(a).
Figure 10:
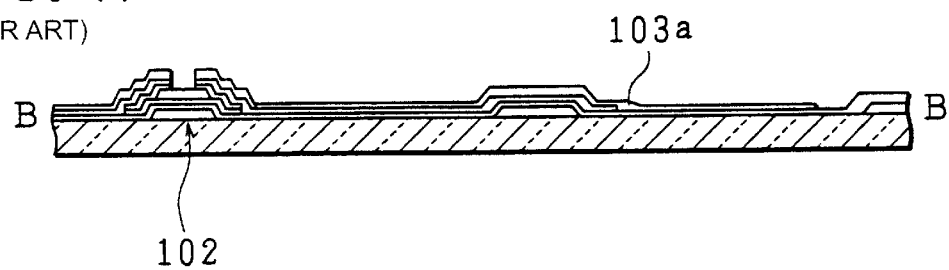
Figure 10:
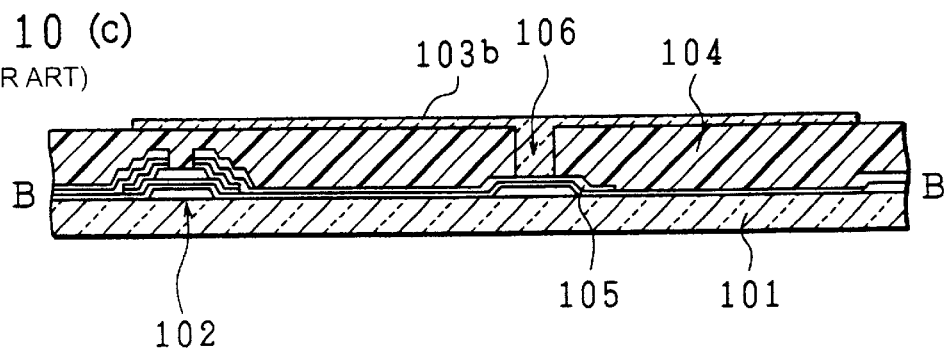
Figure 11:
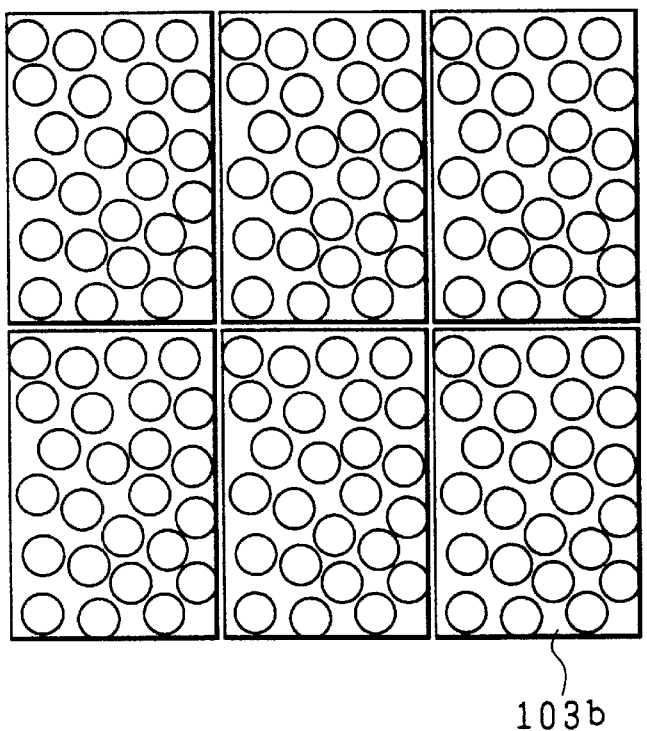
FIG. 11(a) is a plan view of a pixel substrate provided with reflection electrodes on which projections and recesses are formed, in a conventional reflection-type LCD device of POP structure.
FIG. 11(b) is a cross-sectional view of the pixel substrate corresponding to one pixel.
Figure 11:
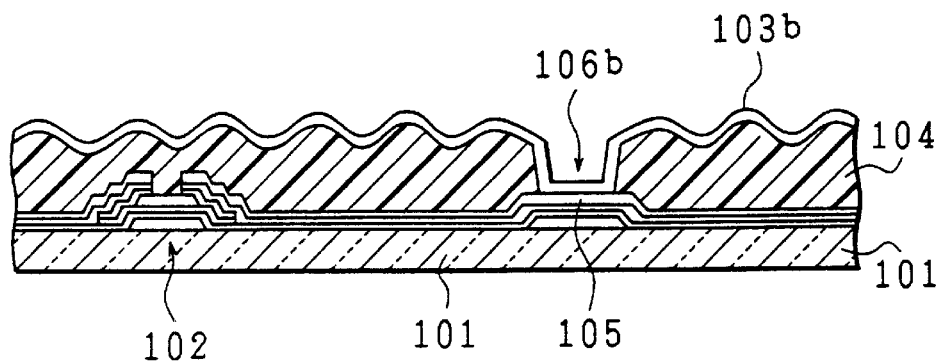
Figure 12:
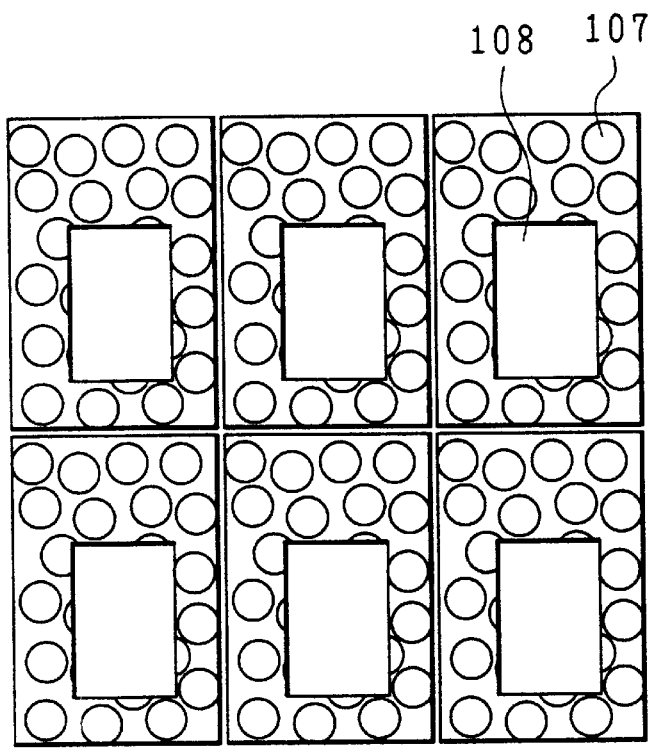
FIG. 12(a) is a plan view of a pixel substrate provided with reflection electrodes on which projections and recesses are formed, in a conventional hybrid-type LCD device of POP structure.
FIG. 12(b) is a cross-sectional view of the pixel substrate corresponding to one pixel.
Figure 12:
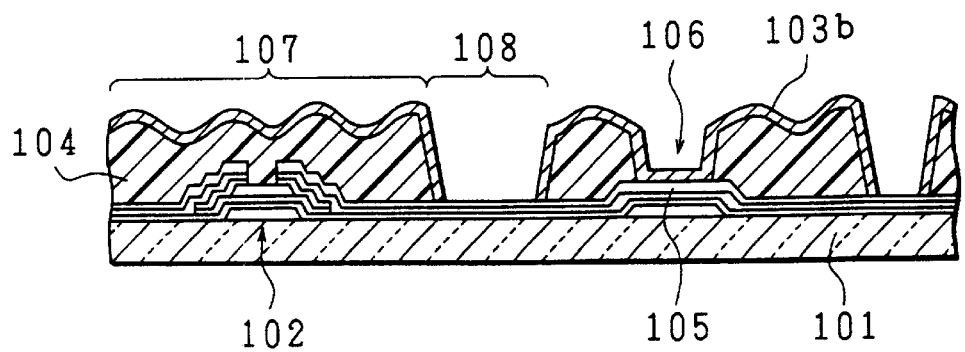
Figure 14A:
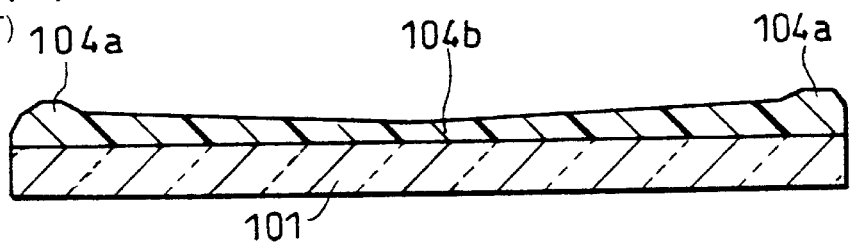
FIG. 14(a) is a cross-sectional view illustrating a pixel substrate in a state in which film thickness distribution occurs to an interlayer insulating film therein.
Figure 14B:
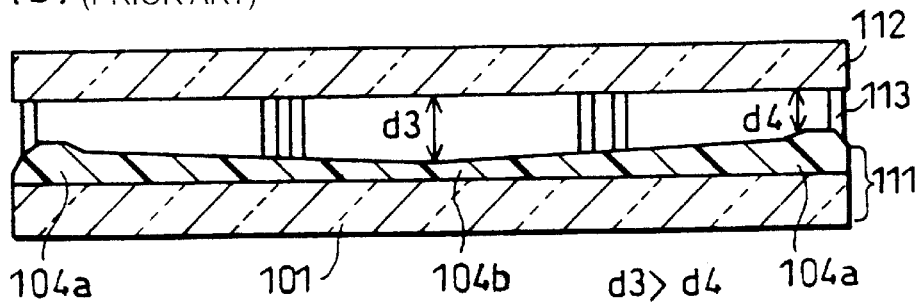
FIG. 14(b) is a cross-sectional view illustrating cell thickness distribution in the case where the foregoing pixel substrate is applied in a panel.
Figure 15:
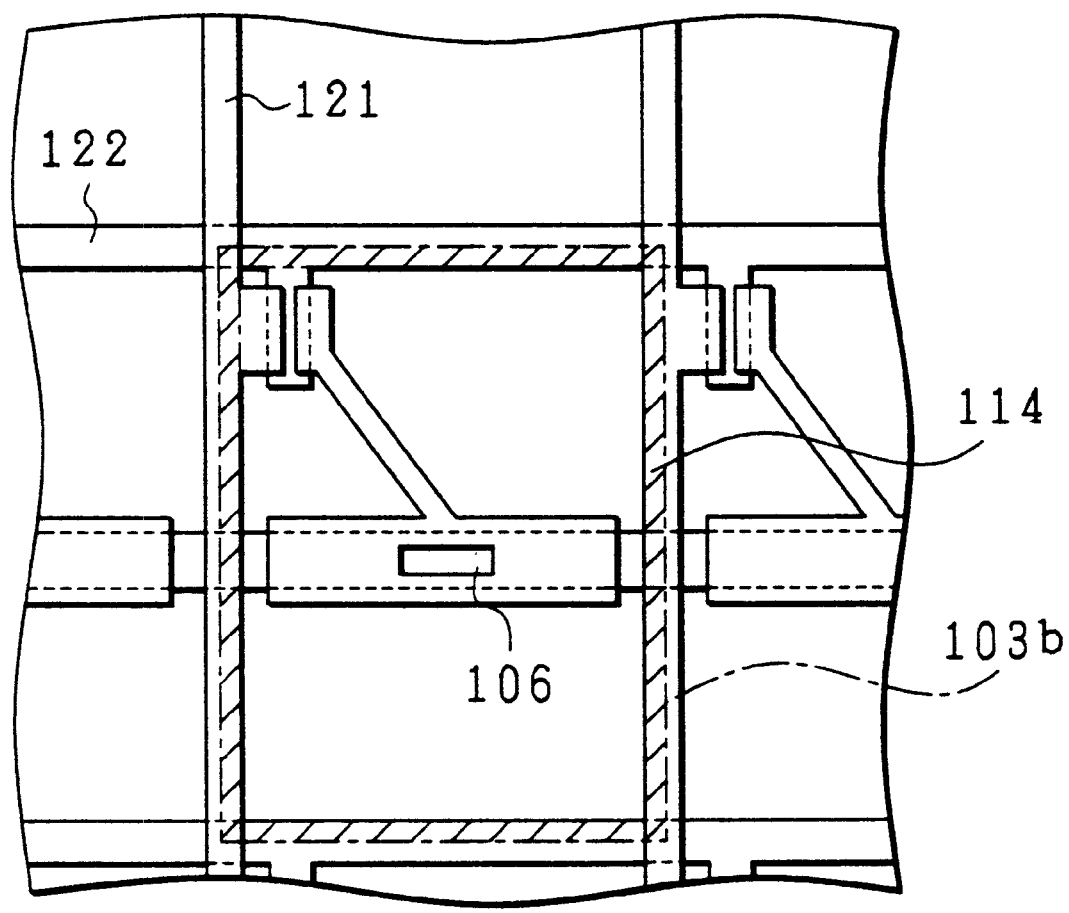
FIG. 15 is a plan view schematically illustrating an LCD device of POP structure, for explaining a portion thereof in which a pixel electrode overlaps signal lines.
Figure 16:
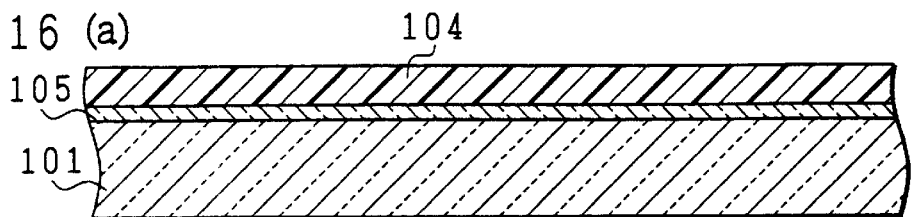
FIGS. 16(a) through 16(e) are process views schematically illustrating a process for fabricating a conventional reflection-type LCD device.
Figure 16:
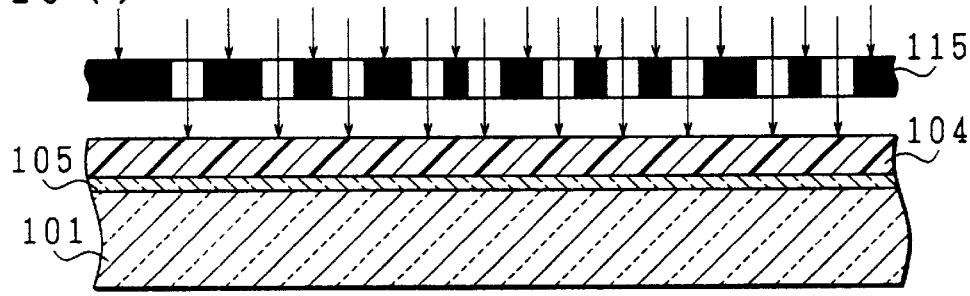
Figure 16:
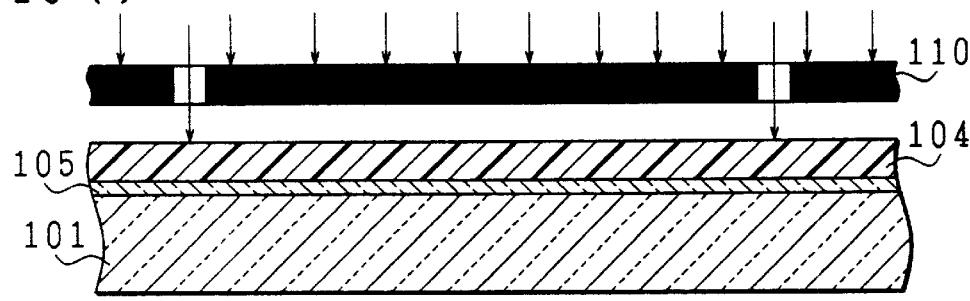
Figure 16:
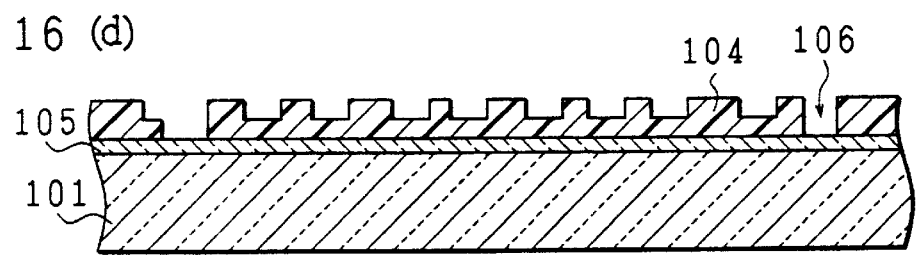
Figure 16:
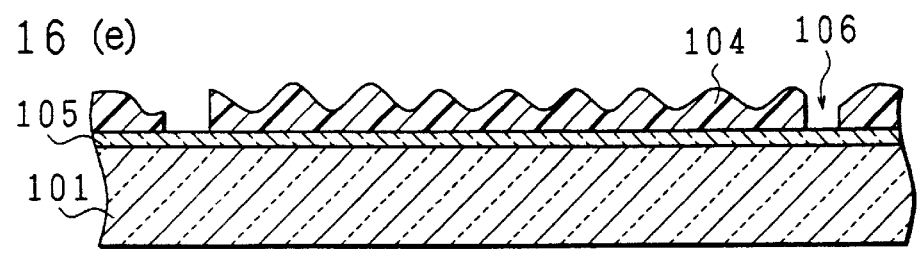
Figure 17:
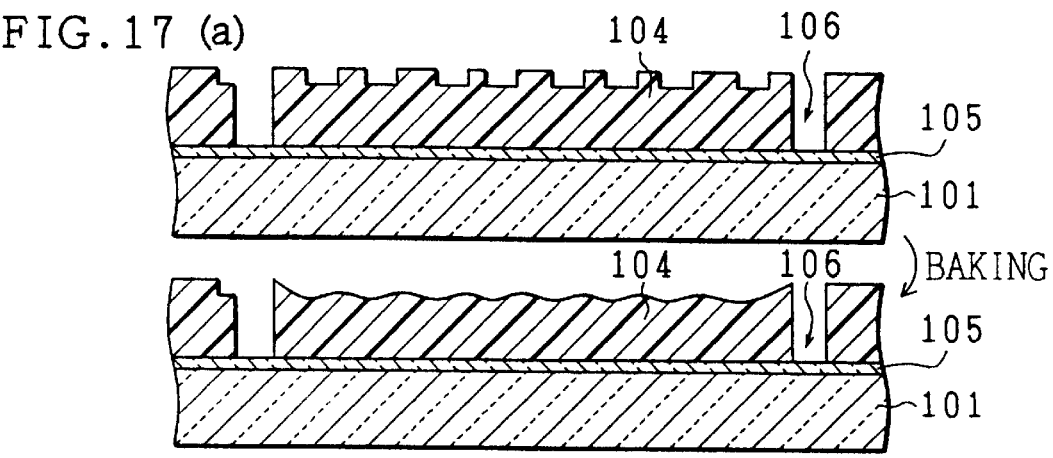
FIGS. 17(a) through 17(c) are explanatory views for explaining problems that occur when projections and recesses are formed on a surface of a thick-formed interlayer insulating film.
Figure 17:
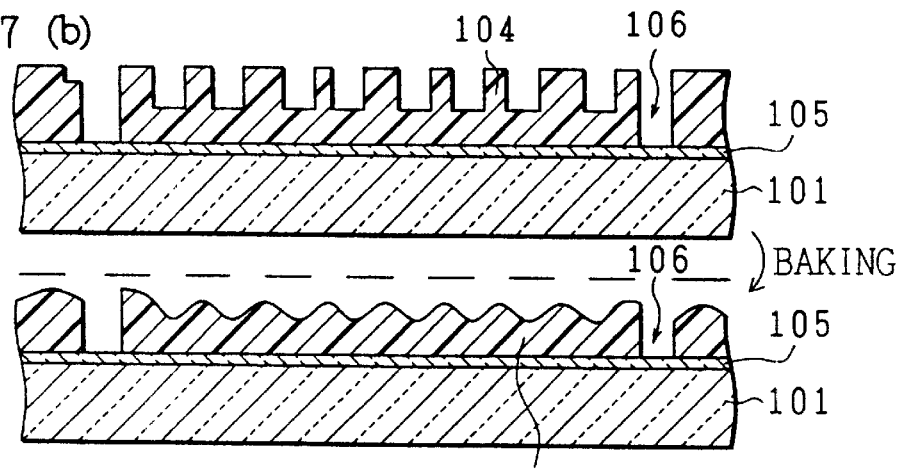
Figure 17:
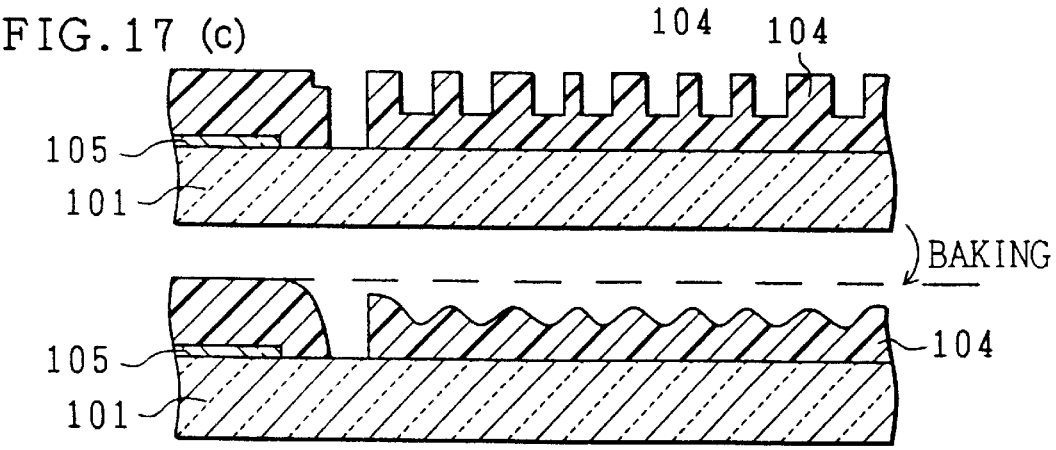

The following description will explain a third embodiment of the present invention, while referring to FIGS. 7 through 9. The description of the present embodiment will explain a method for fabricating a hybrid-type LCD device. The hybrid-type LCD device is an LCD device possessing characteristics of both the transparent type and the reflection type. Incidentally, for conveniences' sake, the members having the same structure (function) as those in the first and second embodiments will be designated by the same reference numerals and their description will be omitted.

An interlayer insulating film formed by the hybridtype LCD device fabricating method in accordance with the present embodiment is formed by using the dry film resist 40 (dry film resist in which the base film 37 has projections and recesses on its surface) that is formed in the second embodiment, and the process of transfer of the photosensitive resin 38 onto the glass substrate 1 so as to form the interlayer insulating film 41 is identical to that in the case of the second embodiment. Incidentally, the thickness of the interlayer insulating film 41 in this case (the film thickness is defined as an average film thickness, since projections and recesses are formed on the surface) is set substantially equal to the cell thickness of the liquid crystal layer. The following description will explain a method for forming a pixel substrate by processing the glass substrate 1 with the interlayer insulating film 41 provided thereon, through the process shown in FIGS. 7(*a*) through 7(*e*).

(i) On the glass substrate 1 on which the lower layer electrodes 2 are provided, an interlayer insulating film 41 is formed by using the dry film resist 40 (see FIG. 7(*a*)).

(ii) The photosensitive resin material 41 is exposed with use of a photo-mask 45 shown in FIG. 8(*c*) (black portions: light blocking regions, white portions: light transmitting regions) (see FIG. 7(*b*)), so that contact holes 4 and transmission regions 43 are formed at the same time (see FIG. 7(*c*)).

(iii) An aluminum (Al) film that will be processed into reflection electrodes 42 is formed by means of a sputtering device (see FIG. 7(*d*)). Here, the lower layer electrodes 2 are made of ITO, and a molybdenum (Mo) layer as a barrier metal is formed beneath the Al film, though not shown, to prevent electric corrosion between ITO and the reflection electrodes 42.

(iv) The reflection electrodes 42 are formed into a predetermined pattern, while portions thereof provided in the transmission regions 43 are removed, by the photolithography and etching processes (see FIG. 7(*e*)).

Figure 18A:
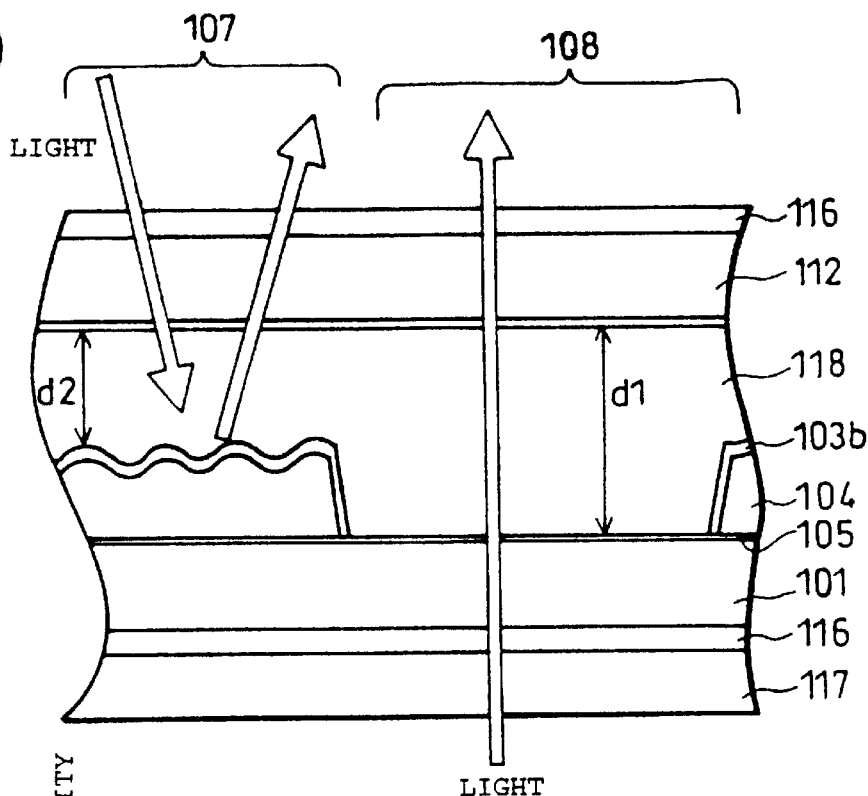
FIG. 18(a) is a cross-sectional view illustrating a basic arrangement of a hybrid-type LCD device.
Figure 18B:
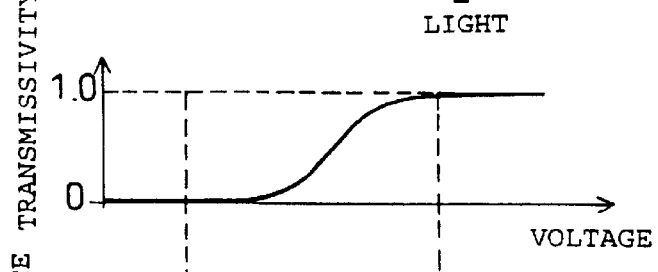
FIG. 18(b) is a graph showing voltage-transmissivity characteristics in a transmission region of the foregoing hybrid-type LCD device.
Figure 18C:
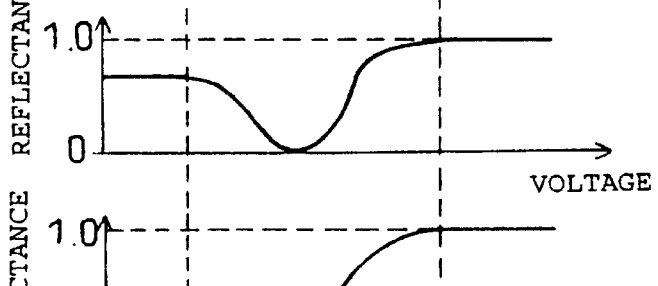
FIG. 18(c) is a graph showing voltage-reflectance characteristics in reflection regions in the foregoing hybrid-type LCD device in the case where a cell thickness d1 in the foregoing transmittance region and a cell thickness d2 in the foregoing reflection region satisfy relationship of d1<2·d2.
Figure 18D:
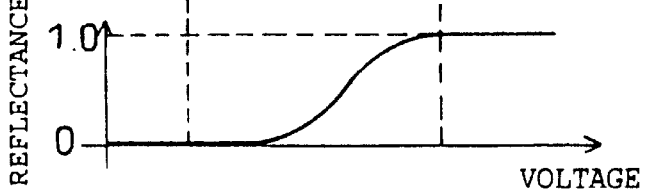
FIG. 18(d) is a graph showing voltage-reflectance characteristics in the foregoing reflection region in the case where the cell thickness d1 in the foregoing transmission region and the cell thickness d2 in the foregoing reflection region satisfy relationship of d1=2·d2.

In the pixel substrate fabricated as described above, each pixel section includes the transmission region 43 and reflection region 44 both. Therefore, a hybrid-type LCD device that is applicable for transmission and reflection both can be fabricated as shown in FIG. 9. Thus, by forming the interlayer insulating film 41 with use of the dry film resist 40, the interlayer insulating film 41 can be made to have a thickness equal to the cell thickness (thickness of the liquid crystal layer 46) d2 in the reflection region 44. Since the thickness of the interlayer insulating film 41 is thus equal to the cell thickness d2 of the reflection region 44, the cell thickness (thickness of the liquid crystal layer 46) d1 in the transmission region 43 is twice the cell thickness d2 in the reflection region 44. Therefore, the cell thickness d2 in the reflection region 44 satisfies the relationship expressed by the formula (5), thereby allowing retardations in the foregoing two regions of transmission and reflection to substantially coincide with each other, like the voltage-reflectance characteristics shown in FIG. 18(d). Incidentally, in FIG. 9, 47 is a polarizing element, 48 is a backlight, and 49 is a counter substrate.

Furthermore, by forming the interlayer insulating film 41 with use of the dry film resist 40, it is possible to make the interlayer insulating film 41 have uniform distribution with accuracy. Consequently, it is possible to provide a hybrid-type LCD device in which occurrence of irregularities in the cell thickness, inconsistency in optical characteristics between the transmission regions 43 and the reflection regions 44, and the like can be suppressed.

Incidentally, the present embodiment is explained with reference to a case where a positive-type resist that allows portions exposed to light to be removed, but needless to say, it is possible to use a negative-type resist that allows portions exposed to light to remain.

As described above, an LCD device fabrication method in accordance with the present invention is a fabrication method of liquid crystal display device having a pair of substrates which are provided vis-a-vis each other and between which a liquid crystal layer is provided, at least one of the substrates being a transparent substrate having transmissivity, the other substrate that is a back substrate provided vis-a-vis the transparent substrate being provided with pixel electrodes with an interlayer insulating film intervening the back substrate and the pixel electrodes, pixel electrodes being respectively connected with lower layer electrodes through contact holes formed in the interlayer insulating film, and the method is characterized by including a first step of forming signal lines and the lower layer electrodes on the back substrate, a second step of forming an interlayer insulating film on the back substrate by using a dry film resist, a third step of forming contact holes at positions corresponding to the lower layer electrodes by patterning the interlayer insulating film to a predetermined pattern, and a fourth step of forming pixel electrodes on the interlayer insulating film.

According to the foregoing method, in fabrication of an LCD device of the POP structure in which an interlayer insulating film is formed between pixel electrodes and a back substrate on which the pixel electrodes are provided, the interlayer insulating film is formed with a dry film resist. Therefore, it is possible to easily form an interlayer insulating film that has very small film thickness distribution inside the face of the back substrate, as well as that is formed thick. This aims to forming an interlayer insulating film with use of a film having a uniform and desirably great thickness.

Furthermore, for example, in the case where a conventional spin coater is used to form the interlayer insulating film, most of the resist dropped first time is spilt by centrifugal force to outside the substrate, thereby resulting in that a very small amount of the same actually remains on the substrate, but application of a dry film resist in forming the interlayer insulating film as in the present invention enables reduction of wasted materials, thereby ensuring that an increase in costs should be suppressed.

This further enables to decrease display defects that occur due to irregularities in the cell thickness. Furthermore, costs can be reduced since materials can be saved as compared with the case where the spin coater is used.

Furthermore, in the foregoing LCD fabrication method of the present invention, (1) in the second step, projections and recesses are formed on a surface of the interlayer insulating film, and (2) in the fourth step, the pixel electrodes are formed with reflection films.

According to the foregoing method, the pixel electrodes are formed as reflection electrodes serving as reflection layers. Therefore, the method of the present invention enables provision of a reflection-type LCD device having an interlayer insulating film that is uniform and thick in film thickness. Furthermore, projections and recesses are formed on a surface of the interlayer insulating film that is a base of the reflection electrodes so as to cause the reflection electrodes to possess a light diffusing property, and by forming such an interlayer insulating film with a dry film resist, an interlayer insulating film having projections and recesses that ensure good reproducibility (stability) can be formed, irrespective of a thickness of the interlayer insulating film.

Consequently, display defects caused by irregularities in the cell thickness to be suppressed, the interlayer insulating film can be formed thick, and at the same time, projections and recesses with stability can be provided. This enables a reflection-type LCD device having a stable light diffusing property to be provided.

Furthermore, an LCD device fabrication method of the present invention is preferably the foregoing LCD fabrication method further arranged so that the dry film resist is formed by forming projections and recesses on a surface of a base film, and further, by laminating a photosensitive material on one surface of the base film on which the projections and recesses are formed.

By the foregoing method, a pattern of projections and recesses is formed on a base film composing the dry film resist, and the foregoing projections and recesses are copied to the photosensitive material that will be formed into the interlayer insulating film. In other words, it is possible to provide a pattern of projections and recesses on the photosensitive resin beforehand, at a dry film resist stage.

This enables to produce projections and recesses on the interlayer insulating film by using the dry film resist, with significantly better reproducibility as compared with the conventional cases in which heat treatment process is applied.

Furthermore, an LCD fabrication method of the present invention may be arranged so that (1) in the first step, the lower layer electrodes are formed in display pixel regions on the back substrate, and (2) in the third step, the interlayer insulating films in the display pixel regions are partially removed by patterning.

According to the foregoing method, a hybrid-type LCD device applicable to both transmission and reflection schemes can be fabricated by using the dry film resist. This ensures achievement of identical effects to those in the case where a reflection-type LCD device is fabricated by using the dry film resist. Furthermore, since the film thickness of the interlayer insulating film can be controlled stably, it facilitates to make voltage-transmissivity (reflectance) characteristics in the transmission regions and the reflection regions substantially coincide with each other.

This enables, not only to achieve the foregoing effects achieved in the case where a reflection-type LCD device is fabricated with a dry film resist, but also to provide a hybrid-type LCD device in which deviations between electric-optical characteristics of the transmission regions and those of reflection regions are suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fabrication method of liquid crystal display device having a pair of substrates which are provided vis-a-vis each other and between which a liquid crystal layer is provided, at least one of the substrates being a transparent substrate having transmissivity, the other substrate that is a back substrate provided vis-a-vis the transparent substrate being provided with pixel electrodes with an interlayer insulating film intervening the back substrate and the pixel electrodes, pixel electrodes being respectively connected with lower layer electrodes through contact holes formed in the interlayer insulating film, said method comprising the steps of:

(a) forming signal lines and the lower layer electrodes on the back substrate;
   (b) forming an interlayer insulating film on the back substrate by using a dry film resist;
   (c) forming contact holes at positions corresponding to the lower layer electrodes by patterning the interlayer insulating film to a predetermined pattern; and
   (d) forming pixel electrodes on the interlayer insulating film.

2. The fabrication method as set forth in claim 1, wherein:
   in said step (b), projections and recesses are formed on a surface of the interlayer insulating film; and
   in said step (d), the pixel electrodes are formed with reflection films.

3. The fabrication method as set forth in claim 2, wherein the dry film resist is formed by the steps of:
   (e) forming projections and recesses on a surface of a base film; and
   (f) laminating a photosensitive material on one surface of the base film on which the projections and recesses are formed.

4. The fabrication method as set forth in claim 2, wherein:
   in said step (a), the lower layer electrodes are formed in display pixel regions on the back substrate; and
   in said step (c), the interlayer insulating films in the display pixel regions are partially removed by patterning.

5. The fabrication method as set forth in claim 3, wherein:
   in said step (a), the lower layer electrodes are formed in the display pixel regions on the back substrate; and
   in said step (c), the interlayer insulating films in the display pixel regions are partially removed by patterning.

6. The fabrication method as set forth in claim 1, wherein, in said step (b), the interlayer insulating film is formed by transferring a dry film resist onto the back substrate.

7. The fabrication method as set forth in claim 1, wherein, in said step (b), the interlayer insulating film is formed by transferring the dry film resist onto the back substrate in a predetermined transfer direction.

8. The fabrication method as set forth in claim 7, wherein the dry film resist is a rolled dry film resist that is formed by rolling up a dry film resist longer than a length of the back substrate in the transfer direction.

9. The fabrication method as set forth in claim 1, wherein the dry film resist is formed by laminating a photosensitive material on a base film.

10. The fabrication method as set forth in claim 3, wherein, in said step (e), a pattern of projections and recesses on the surface of the base film is formed by copying a pattern of projections and recesses on a projections/recesses-forming master onto the base film, the projections/recesses-forming master being prepared beforehand.

11. The fabrication method as set forth in claim 2, wherein:
   the lower layer electrodes are formed with a transparent material;
   in said step (c), the interlayer insulating film is removed in predetermined regions on the back substrate; and
   after said step (d), transmission regions are formed by removing the pixel electrodes in the predetermined regions.

12. The fabrication method as set forth in claim 3, wherein the photosensitive material is a photosensitive resin.

13. The fabrication method as set forth in claim 9, wherein the photosensitive material is a photosensitive resin.

14. The fabrication method as set forth in claim 10, wherein:
   a pattern of projections and recesses on a projections/recesses-forming master is formed through a photolithography process; and
   an exposing device used in the photolithography process is a stepper.

15. The method of claim 2, wherein the projections and recesses are formed in advance on only one side of the dry film resist.

* * * * *